United States Patent
Nakai et al.

(10) Patent No.: US 8,971,163 B2
(45) Date of Patent: Mar. 3, 2015

(54) OPTICAL DISC DEVICE, OPTICAL DISC AND TESTING METHOD OF OPTICAL DISC

(75) Inventors: Kenya Nakai, Tokyo (JP); Masayuki Omaki, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 13/995,625

(22) PCT Filed: Jan. 6, 2012

(86) PCT No.: PCT/JP2012/050184
§ 371 (c)(1),
(2), (4) Date: Jun. 19, 2013

(87) PCT Pub. No.: WO2012/093723
PCT Pub. Date: Jul. 12, 2012

(65) Prior Publication Data
US 2013/0286808 A1    Oct. 31, 2013

(30) Foreign Application Priority Data
Jan. 7, 2011    (JP) .................................. 2011-002405

(51) Int. Cl.
*G11B 7/126*    (2012.01)
*G11B 7/1263*   (2012.01)
(Continued)

(52) U.S. Cl.
CPC .............. *G11B 7/1263* (2013.01); *G11B 7/268* (2013.01); *G11B 7/1376* (2013.01);
(Continued)

(58) Field of Classification Search
CPC .... G11B 7/007; G11B 7/1263; G11B 7/1267; G11B 7/1376; G11B 7/24; G11B 7/2403; G11B 7/24065; G11B 2007/0006; G11B 2007/0013
USPC ......... 369/94, 283, 59.25, 47.5, 47.51, 47.52, 369/47.53, 53.26, 116, 275.3, 275.4, 53.19
See application file for complete search history.

(56) References Cited

U.S. PATENT DOCUMENTS 5,546,372 A   8/1996  Ohsawa et al.
6,144,628 A * 11/2000 Matsuura ..................... 369/47.5
(Continued)

FOREIGN PATENT DOCUMENTS

JP    7-320291 A    12/1995
JP    9-282729 A    10/1997
(Continued)

OTHER PUBLICATIONS

Fuji, H. et al., "Bit-by-Bit Detection on Super-Resolution Near-Field Structure Disk with Platinum Oxide Layer," Jpn. J. Appl. Phys., vol. 42, 2003, pp. L589-L591.

*Primary Examiner* — Thomas Alunkal
(74) *Attorney, Agent, or Firm* — Birch, Stewart, Kolasch & Birch, LLP

(57) ABSTRACT

An optical disc device uses an optical disc (6) capable of super-resolution reproduction, and includes a semiconductor laser (1), a laser driving circuit (21) that supplies a driving current to the semiconductor laser, a light receiving element (8) that detects return light from the optical disc (6) and obtains reproduction signal of recording data of the optical disc (6), and a light emission amount control means (22) that controls a light emission amount of the semiconductor laser (1) by the laser driving circuit (21) so as to keep a peak intensity of a focused light spot formed on an information recording layer of the optical disc 6 to be greater than or equal to a peak intensity at which a super-resolution effect is obtained. The light emission amount control means (22) controls a light emission amount of the semiconductor laser (1) by the laser driving circuit (21) based on a decrease rate D of a peak intensity of a focused light spot on an information recording layer of the optical disc (1) determined by an assumed disc tilt and a comatic aberration according to a thickness of a light transmitting layer of the optical disc (1), and a lower limit value $Pld\_L$ of a light emission amount at which a predetermined reproduction performance is obtained.

6 Claims, 10 Drawing Sheets

(51) Int. Cl.
*G11B 7/26* (2006.01)
*G11B 7/1376* (2012.01)
*G11B 7/24065* (2013.01)
*G11B 7/00* (2006.01)

(52) U.S. Cl.
CPC .... *G11B 7/24065* (2013.01); *G11B 2007/0006* (2013.01); *G11B 2007/0013* (2013.01)
USPC .................. 369/47.5; 369/53.26; 369/53.19

(56) References Cited

U.S. PATENT DOCUMENTS

| | | | |
|---|---|---|---|
| 6,169,714 B1 | 1/2001 | Tanaka et al. | |
| 6,392,970 B1 | 5/2002 | Fuji et al. | |
| 6,940,797 B1 | 9/2005 | Lee et al. | |
| 7,239,586 B2 * | 7/2007 | Shoji et al. | 369/47.53 |
| 8,223,620 B2 * | 7/2012 | Sakai et al. | 369/275.4 |
| 2002/0001269 A1 * | 1/2002 | Yamazaki | 369/47.51 |
| 2002/0034137 A1 * | 3/2002 | Okumura et al. | 369/47.5 |
| 2002/0089908 A1 * | 7/2002 | Okumura et al. | 369/47.5 |
| 2005/0117507 A1 * | 6/2005 | Hwang et al. | 369/275.4 |
| 2007/0206482 A1 * | 9/2007 | Aoyama et al. | 369/116 |
| 2007/0274185 A1 * | 11/2007 | Kikukawa et al. | 369/59.1 |
| 2010/0083295 A1 | 4/2010 | Eto et al. | |
| 2010/0118672 A1 * | 5/2010 | Yamamoto et al. | 369/47.14 |
| 2010/0226235 A1 | 9/2010 | Nagatomi | |
| 2010/0232269 A1 | 9/2010 | Yamamoto et al. | |
| 2010/0290328 A1 * | 11/2010 | Eto et al. | 369/47.53 |

FOREIGN PATENT DOCUMENTS

| | | |
|---|---|---|
| JP | 10-283729 A | 10/1998 |
| JP | 11-53781 A | 2/1999 |
| JP | 11-120639 A | 4/1999 |
| JP | 2001-23174 A | 1/2001 |
| JP | 2002-015480 A | 1/2002 |
| JP | 2003-109239 A | 4/2003 |
| JP | 2003-288725 A | 10/2003 |
| JP | 3519102 B2 | 4/2004 |
| JP | 2010-86581 A | 4/2010 |
| JP | 2010-205339 A | 9/2010 |
| JP | 2010-257569 A | 11/2010 |
| JP | 2010-267303 A | 11/2010 |
| WO | WO 2009/050994 A1 | 4/2009 |

* cited by examiner

FIG. 10
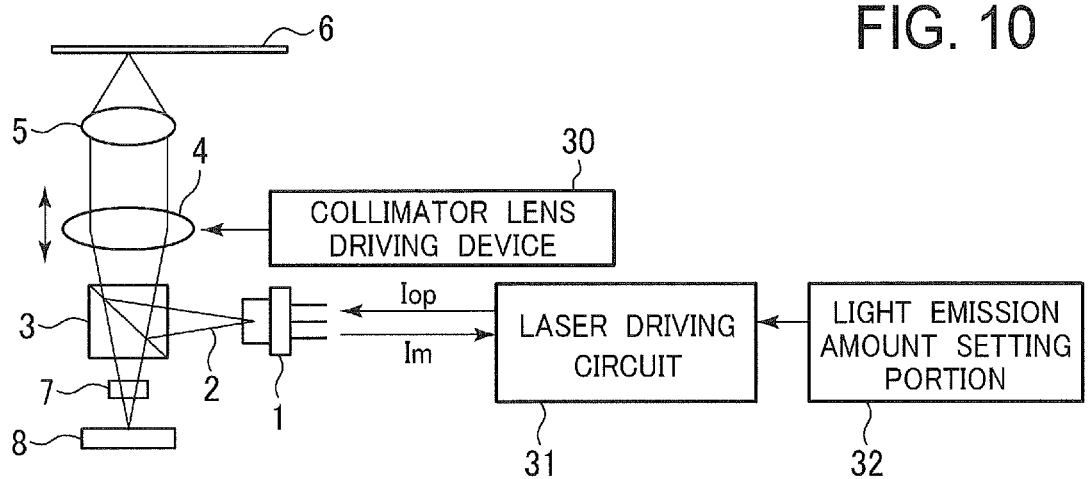
FIG. 11
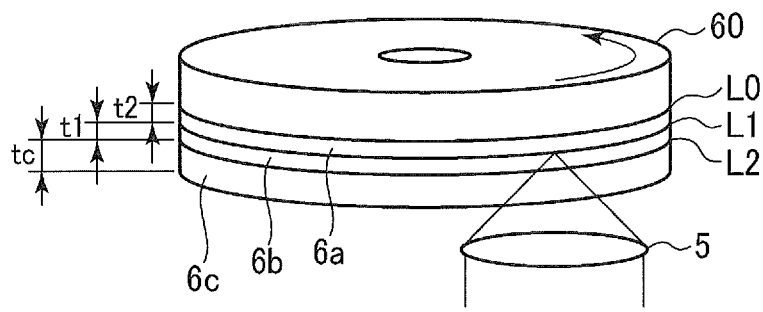
FIG. 12(a)  FIG. 12(b)  FIG. 12(c)
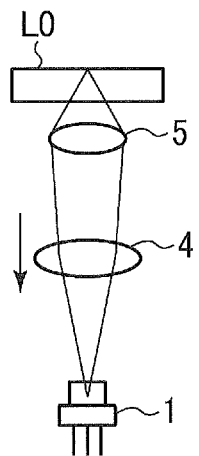 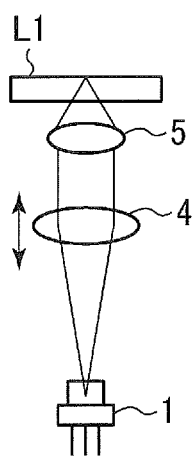 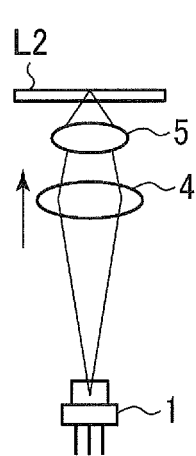

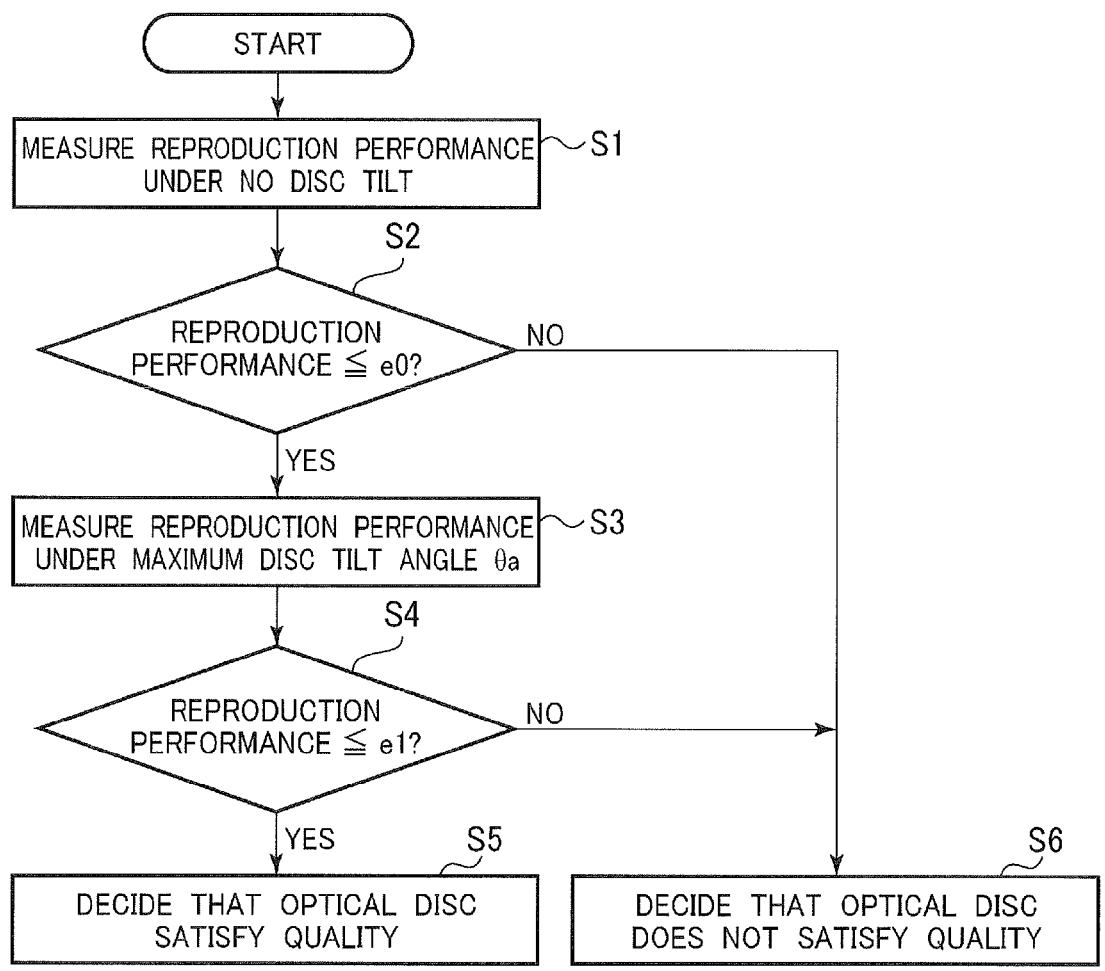

OPTICAL DISC DEVICE, OPTICAL DISC AND TESTING METHOD OF OPTICAL DISC

TECHNICAL FIELD

The present invention relates to an optical disc capable of super-resolution reproduction, an optical disc device using the optical disc, and a testing method of the optical disc.

BACKGROUND ART

Optical discs such as a CD (Compact Disc), a DVD (Digital Versatile Disc) and a BD (Blu-ray Disc: trademark) are information recording media to which information such as image data or music data is recorded and from which recorded information is reproduced by irradiation of laser light.

Capacities of the optical discs have been increasing through generations. For example, regarding the CD, a disc substrate (a light transmitting layer) has a thickness of approximately 1.2 mm, a wavelength of laser light is approximately 780 nm, a numerical aperture (NA) of an objective lens is 0.45, and a capacity is 650 MB. In contrast, regarding the DVD of a later generation, two disc substrates (light transmitting layers) each having a thickness of approximately 0.6 mm are laminated, a wavelength of laser light is approximately 650 nm, a numerical aperture of an objective lens is 0.6, and a capacity of 4.7 GB is achieved. Regarding the BD having a higher recording density, a protection layer (a light transmitting layer) covering an information recording surface has a thickness of approximately 0.1 mm, a wavelength of laser light is approximately 405 nm, a numerical aperture of an objective lens is 0.85. The BD in the form of a single-layered disc has achieved a capacity of 25 GB, and the BD in the form of a double-layered disc has achieved a capacity of 50 GB, so that high-definition high-vision images can be recorded for a long time.

It is predicted that a user will use next-generation high-definition images exceeding high-vision images, three-dimensional images or the like, and therefore an amount of data will increase in future. Therefore, development of an optical disc capable of storing a larger amount of data than the BD is demanded.

An increase in capacity of the optical disc is achieved by reducing a size of a focused light spot at a focal plane of the objective lens by shortening a wavelength of the laser light and by increasing the NA of the objective lens, and by reducing a size of a recording mark on a track of an image recording layer. However, the reduction in size of the focused light spot has a physical limit determined by optical property and the wavelength of the laser light. To be more specific, it is said that a diffraction limit $\lambda/(4NA)$ determined by the wavelength $\lambda$ of the laser light and the NA of the objective lens is a limit of the size of the reproducible recording mark.

Recently, an optical disc (hereinafter, referred to as a super-resolution optical disc) is drawing attention as an optical disc achieving high-density recording and reproducing beyond the physical limit. The super-resolution optical disc has a super-resolution layer whose optical property (light absorbing property, light transmitting property or the like) nonlinearly changes based on an intensity of laser light. When the super-resolution layer is irradiated with laser light, a change in optical property such as refractive index occurs in a portion of an irradiation area where a light intensity is locally high or where temperature is locally high. Localized light (near-filed light, localized plasmon light or the like) generated at the portion interacts with the recording mark on the information recording layer and is converted into propagation light. This enables reproduction of information from a minute recording mark smaller than the diffraction limit $\lambda/(4NA)$ using a BD optical head. In other words, higher recording density can be achieved using the laser light having the wavelength of 405 nm and the objective lens having the NA of 0.85. A structure of such a super-resolution optical disc is disclosed in, for example, Non-Patent Document No. 1 described below.

PRIOR ART DOCUMENTS

Patent Documents

Patent Document No. 1: Japanese Patent Publication Number 3,519,102 (see paragraphs 0014-0016 and FIG. 4)
Patent Document No. 2: Internal Publication No. 2009-050994 (see paragraphs 0031-0053 and FIG. 3)
Non-Patent Document No. 1: Hiroshi Fuji et al., "Bit-By-Bit Detection on Super-Resolution Near-Field Structure Disk with Platinum Oxide Layer", Jpn. J. Appl. Phys. Vol. 42 (2003) pp. L589-L591

DISCLOSURE OF THE INVENTION

Problems to be Solved by the Invention

In the super-resolution optical disc, the optical property changes at the portion where the light intensity is locally high or the temperature is locally high within the irradiation area, i.e., the focused light spot. Therefore, the super-resolution optical disc has property that super-resolution effect appears at a portion where the light intensity is higher than a certain threshold within the focused light spot. Usually, a region around a peak intensity of the focused light spot corresponds to the above described portion where the light intensity is locally high or the temperature is locally high (i.e., the portion where the super-resolution effect appears). Therefore, if the peak intensity of the focused light spot decreases to the threshold or lower, the super-resolution effect significantly decreases, and a reproduction performance decreases.

In contrast, in the optical disc device, there are cases where a disc tilt with respect to an optical axis of an objective lens of the optical disc may occur due to causes such as an inclination of an axis of a disc rotation motor or a warpage of the optical disc. The disc tilt causes a comatic aberration, and a peak intensity of the focused light spot decreases. When the peak intensity decreases, the reproduction performance decreases as described above. Therefore, suppression of the disc tilt is an issue for the optical disc device using the super-resolution optical disc.

For this reason, in Patent Document No. 1, a loop circuit is provided for suppressing decrease in the peak intensity utilizing that a refractive index of nonlinear material used in the super-resolution layer increases due to the increase in temperature. The loop circuit performs a control based on an output value (a total amount of light) of a light receiving element that detects reflection light (return light) from the super-resolution optical disc and an output value of another light receiving element that detects emission light from a semiconductor laser serving as a light source so that a ratio of both outputs becomes constant. To be more specific, the loop circuit controls a drive current of the semiconductor laser so that a ratio of a total amount of the reflection light from the optical disc (a total amount of light received by the light receiving element) to a total amount of the emission light from the semiconductor laser is a certain constant value.

In contrast, if the comatic aberration is caused by the disc tilt, the peak intensity at a center portion of the focused light spot decreases. Light which is not focused on the center portion of the focused light spot forms a first-order ring light (i.e., flare light) on a periphery. If the comatic aberration is excessively large, a part of the return light does not enter a pupil of the objective lens in a forward light path, and therefore the total amount of the reflection light from the optical disc decreases. However, if the comatic aberration is relatively small, most of the first-order ring light (flare light) enters the pupil of the objective lens in the forward light path, and forms a part of the return light. Therefore, the total amount of the reflection light is almost unchanged even when the peak intensity at the center portion of the focused light spot decreases.

Further, if a ratio of the light intensity at a periphery of the pupil of the objective lens to the light intensity at a center of the objective lens is close to 1 (i.e., if a radiation angle of the semiconductor laser is large), a change in the amount of the return light entering the pupil of the objective lens in the forward light path when the above described disc tilt occurs becomes further smaller. In other words, the decrease in the peak strength at the center portion of the focused light spot is less likely to appear as the change in the total amount of the reflection light. As above, it is difficult to suppress the decrease in the peak strength of the focused light spot based on the total amount of the reflection light, and it is not easy to maintain constant the super-resolution effect.

Further, regarding the super-resolution optical disc, there is proposed a multilayer super-resolution disc including a plurality of information recording layers each having a super-resolution layer as disclosed in Patent Document No. 2. The multilayer super-resolution disc has a merit of being capable of storing a large amount of data according to the number of information recording layers as well as existing multilayer media such as the BD, DVD and CD.

In the multilayer super-resolution optical disc, distances from a disc surface to the respective information recording layers are different. Therefore, when forming the focused light spot on the information recording layer of the multilayer super-resolution optical disc, it is necessary to correct a spherical aberration that occurs according to a thickness of a light transmitting layer. Generally, the spherical aberration is corrected by, for example, controlling a movement of a collimator lens disposed in front of the objective lens (on a side closer to the light source) in a direction of an optical axis so as to change a divergence angle of light incident on the objective lens.

However, the amount of light entering an entrance pupil of the objective lens changes according to the movement of the collimator lens. Therefore, in a configuration in which the amount of the emission light from the semiconductor laser is controlled to be kept constant, the peak intensity of the focused light spot differs among the information recording layers. Therefore, the peak intensity cannot be obtained as desired at each information recording layer.

The present invention is intended to solve the above described problems, and an object of the present invention is to suppress the decrease in peak intensity of the focused light spot that may occur when the comatic aberration is caused by the disc tilt or when the multilayer super-resolution optical disc is used, and to thereby suppress decrease in a reproduction performance when the super-resolution optical disc is used.

Means of Solving the Problems

According to a first aspect of the present invention, there is provided an optical disc device that reproduces an optical disc capable of super-resolution reproduction. The optical disc device including a semiconductor laser, a laser driving circuit that supplies a driving current to the semiconductor laser, a light receiving element that detects return light from the optical disc and obtains reproduction signal of recording data of the optical disc, and a light emission amount control means that controls a light emission amount of the semiconductor laser by the laser driving circuit so as to keep a peak intensity of a focused light spot formed on an information recording layer of the optical disc to be greater than or equal to a peak intensity at which a super-resolution effect is obtained. The light emission amount control means controls a light emission amount of the semiconductor laser by the laser driving circuit based on a decrease rate D of the peak intensity of a focused light spot on the information recording layer of the optical disc determined by an assumed disc tilt and a comatic aberration according to a thickness of a light transmitting layer of the optical disc, and a lower limit value Pld_L of a light emission amount at which a predetermined reproduction performance is obtained.

According to a second aspect of the present invention, there is provided an optical disc device that reproduces an optical disc capable of super-resolution reproduction. The optical disc device includes a semiconductor laser, a laser driving circuit that supplies a driving current to the semiconductor laser, a light receiving element that detects return light from the optical disc and obtains reproduction signal of recording data of the optical disc, and a light emission amount control means that controls a light emission amount of the semiconductor laser by the laser driving circuit so as to keep a peak intensity of a focused light spot formed on an information recording layer of the optical disc to be greater than or equal to a peak intensity at which a super-resolution effect is obtained. When the optical disc includes a plurality of information recording layers, the light emission amount control means controls a light emission amount of the semiconductor laser by the laser driving circuit based on a fluctuation rate of an amount of light entering an entrance pupil of an objective lens provided in the optical disc device so as to face the optical disc determined based on a thickness from a surface of the optical disc to a information recording layer to be accessed, a decrease rate Dm of a peak intensity of a focused light spot on an information recording layer of the optical disc determined based on an assumed disc tilt and a comatic aberration according to the thickness of the light transmitting layer of the optical disc, and a lower limit value Pld_L of a light emission amount at which a predetermined reproduction performance is obtained.

According to a third aspect of the present invention, there is provided an optical disc device that reproduces an optical disc capable of super-resolution reproduction. The optical disc device includes a semiconductor laser, a laser driving circuit that supplies a driving current to the semiconductor laser, a light receiving element that detects return light from the optical disc and obtains reproduction signal of recording data of the optical disc, and a light emission amount control means that controls a light emission amount of the semiconductor laser by the laser driving circuit so as to keep a peak intensity of a focused light spot formed on an information recording layer of the optical disc to be greater than or equal to a peak intensity at which a super-resolution effect is obtained. The light emission amount control means includes a modulation amplitude detection means that detects modulation amplitude of reproduction signal of recording data of the optical disc detected by the light receiving element, and an inverting means that that creates envelope signal of the modulation amplitude of the reproduction signal based on a change in the modulation amplitude detected by the modulation amplitude detection means, and creates inverted signal of the envelope signal of the modulation amplitude of the reproduction signal. A driving current supplied to the semiconductor laser by the laser driving circuit is determined by the inverted signal.

According to a fourth aspect of the present invention, there is provided an optical disc device that reproduces an optical disc capable of super-resolution reproduction. The optical disc device includes a semiconductor laser, a laser driving circuit that supplies a driving current to the semiconductor laser, a light receiving element that detects return light from the optical disc and obtains reproduction signal of recording data of the optical disc, and a light emission amount control means that controls a light emission amount of the semiconductor laser by the laser driving circuit so as to keep a peak intensity of a focused light spot formed on an information recording layer of the optical disc to be greater than or equal to a peak intensity at which a super-resolution effect is obtained. The light emission amount control means controls the light emission amount of the semiconductor laser by the laser driving circuit based on information on upper and lower limits of a reproduction power corresponding to allowable limits of a reproduction performance of the optical disc, or based on information on a desirable reproduction power.

According to a fifth aspect of the present invention, there is provided an optical disc capable of super-resolution reproduction using an objective lens. An upper limit of a reproduction power serving as an allowable limit of a reproduction performance is set to be an upper limit of an amount of light emitted by the objective lens at which a predetermined value of a first reproduction performance is obtained when no disc tilt occurs. A lower limit of the reproduction power serving as an allowable limit of a reproduction performance is set to be a lower limit of an amount of light emitted by the objective lens at which a predetermined value of a first reproduction performance is obtained when a predetermined disc tilt angle is given.

According to a sixth aspect of the present invention, there is provided a testing method for determining a quality of an optical disc capable of super-resolution reproduction using an objective lens. It is decided that an optical disc being tested satisfies a quality capable of super-resolution reproduction, if a relationship that an upper limit Pr_H0 of an amount of light emitted by an objective lens at which a predetermined value e0 of a first reproduction performance is obtained when no disc tilt occurs is greater than or equal to a lower limit Pr_L1 of an amount of light emitted by the objective lens at which a predetermined value e1 of a second reproduction performance is obtained when a predetermined disc tilt angle is given is satisfied. It is decided that an optical disc being tested does not satisfy a quality capable of super-resolution reproduction, if the relationship is not satisfied.

According to a seventh aspect of the present invention, there is provided a testing method for determining a quality of an optical disc capable of super-resolution reproduction using an objective lens. It is decided that an optical disc being tested satisfies a quality capable of super-resolution reproduction, if a relationship that an amount Pr1 of light at which a minimum reproduction performance is obtained when a predetermined disc tilt angle is given is greater than or equal to a lower limit Pr_L0 of an amount of light emitted by the objective lens at which the predetermined value e0 of the first reproduction performance is obtained when no disc tilt occurs, and is less than or equal to an upper limit Pr_H0 of an amount of light emitted by the objective lens at which a predetermined value e0 of the first reproduction performance is obtained is satisfied. It is decided that an optical disc being tested does not satisfy a quality capable of super-resolution reproduction, if the relationship is not satisfied.

Effect of the Invention

According to the present invention, a peak intensity of a focused light spot can be kept to be greater than or equal to a peak intensity at which a super-resolution effect is obtained. Therefore, it is possible to suppress decrease in a reproduction performance even when a comatic aberration is caused by a disc tilt or when a multilayer super-resolution optical disc is used.

BRIEF DESCRIPTION OF THE DRAWINGS

[FIG. 10] is a view showing a configuration of an optical disc device according to Embodiment 3 of the present invention.

[FIG. 11] is a view showing a schematic configuration of a multilayer super-resolution optical disc.

[FIGS. 12(a), 12(b) and 12(c)] are views for illustrating a change in an amount of light entering an entrance pupil of an objective lens 5 according to a movement of a collimator lens 4.

[FIG. 18] is a graph showing a change in a reproduction performance with respect to a change in an amount of light of a focused light spot (reproduction power) when a maximum value of a disc tilt is θa.

[FIG. 20] is a flowchart showing a testing method of a super-resolution optical disc.

MODE FOR CARRYING OUT THE INVENTION

Hereinafter, various embodiments of the present invention will be described with reference to drawings.

Embodiment 1

Figure 1:
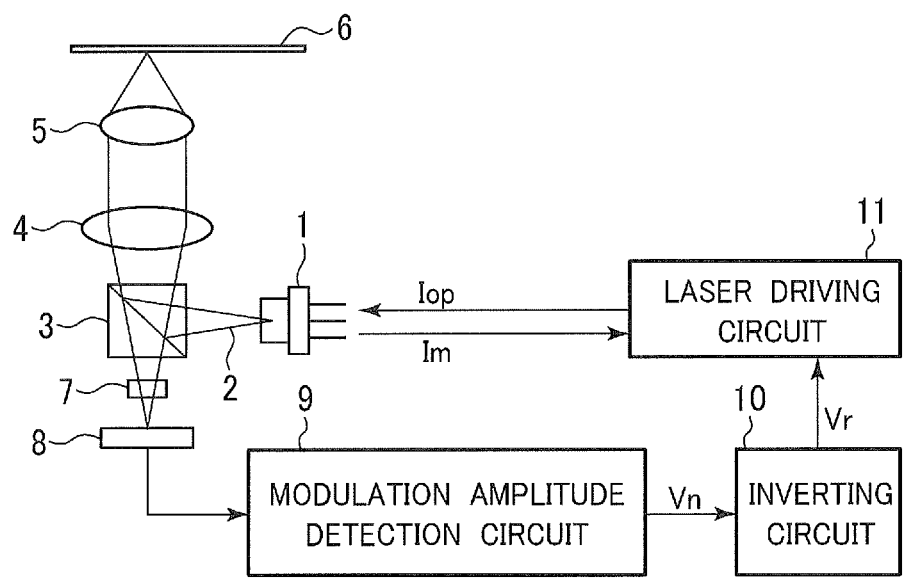
[FIG. 1] is a view showing a configuration of an optical disc device according to Embodiment 1 of the present invention.

FIG. 1 is a view showing a configuration of an optical disc device according to Embodiment 1. The optical disc device is configured to use an optical disc (a super-resolution optical disc) 6 capable of super-resolution reproduction. The super-resolution optical disc 6 includes a super-resolution layer whose optical property (transmittance or the like) nonlinearly changes based on an intensity of irradiation light, and the super-resolution layer is provided so as to cover an information recording layer.

As shown in FIG. 1, the optical disc device includes a semiconductor laser 1 serving as a light source that emits a light beam 2, and a prism 3 on which the light beam 2 is incident. The prism 3 is configured to reflect the light beam 2 from the semiconductor laser 1 by 90 degrees. A collimator lens 4 and an objective lens 5 are arranged along a proceeding direction of light reflected by the prism 3. The collimator lens 4 and the objective lens 5 transmit the light beam 2. The objective lens 5 is disposed so as to face the optical disc 6.

The light beam 2 emitted by the semiconductor laser 1 is reflected by the prism 3, passes the collimator lens 4 and the objective lens 5, and is incident on the optical disc 6. Reflection light (return light) from the optical disc 6 passes the objective lens 5 and the collimator lens 4, is incident on the prism 3, passes the prism 3, and is incident on a light receiving element 8 via an optical element 7 for detecting a focusing error or a tracking error. Recording data is read based on reproduction signal outputted from the light receiving element 8.

The optical disc device further includes a modulation amplitude detection circuit 9 into which the reproduction signal from the light receiving element 8 is inputted, and an inverting circuit 10 into which output signal (modulation amplitude value signal) from the modulation amplitude detection circuit 9 is inputted, and a laser driving circuit 11 that supplies a driving current Iop to the semiconductor laser 1 to cause the semiconductor laser 1 to emit the light beam 2. The modulation amplitude detection circuit 9 and the inverting circuit 10 constitute a light emission amount control means.

Figure 2:
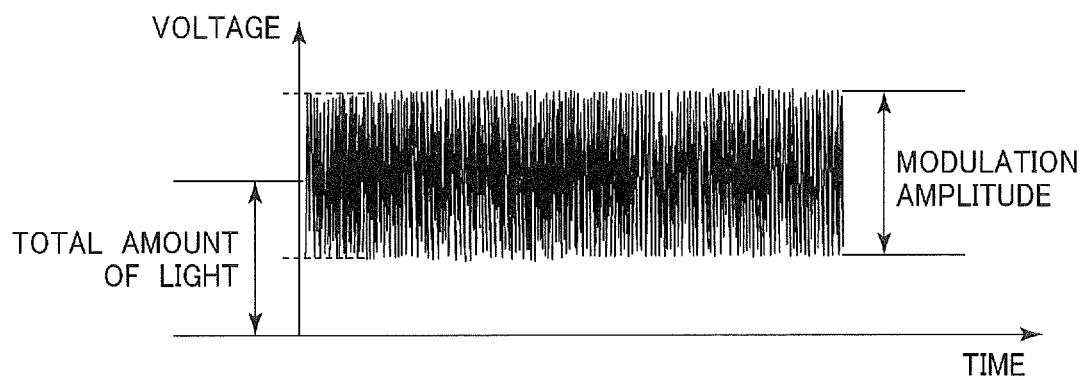
[FIG. 2] is a view showing an example of a waveform of reproduction signal when no disc tilt occurs.

FIG. 2 is a view showing an example of a waveform of the reproduction signal outputted from the light receiving element 8. A horizontal axis indicates time, and a vertical axis indicates an output voltage. Generally, as a recording mark length becomes longer, larger modulation amplitude is exhibited as shown in FIG. 2. As the recording mark length becomes shorter, the modulation amplitude becomes smaller. In this regard, a center value of the modulation amplitude corresponds to a total amount of light received by the light receiving element 8.

The optical disc 6 is held by a turntable rotated by a not shown disc rotation motor (a spindle motor), and rotates. In this state, during a rotation of the optical disc 6, a disc tilt with respect to a direction of an optical axis of the objective lens 5 occurs due to a warpage of the optical disc 6, a swing of a rotation axis of the disc rotation motor, or an insufficient fixing or misalignment of the optical disc 6 with respect to the turntable. The disc tilt causes a comatic aberration of the light beam 2, and a light intensity distribution of a focused light spot formed on the information recording layer changes from an ideal light intensity distribution.

Figure 3:
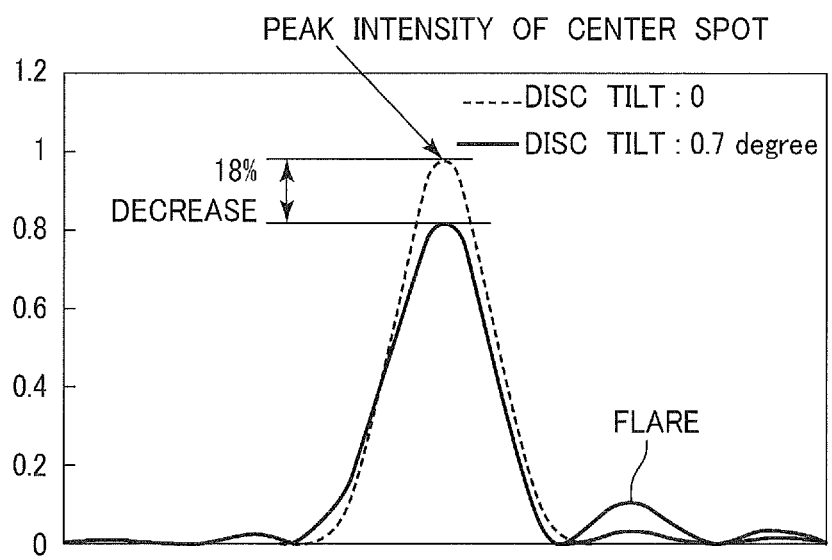
[FIG. 3] is a view showing a result of simulation of a light intensity of a focused light spot when a disc tilt occurs.

FIG. 3 is a view showing a result of simulation of the light intensity distribution of the focused light spot when the comatic aberration occurs due to the disc tilt. In FIG. 3, a light intensity distribution shown by a dashed line indicates the ideal light intensity distribution when no disc tilt occurs (0 degree) and the comatic aberration does not occur. In contrast, a light intensity distribution shown by a solid line indicates a light intensity distribution when the disc tilt is 0.7 degree. When the disc tilt is 0.7 degree, the comatic aberration occurs, and it becomes impossible to collect light to a diffraction limit. Therefore, a peak intensity at a center of the focused light spot (hereinafter, also referred to as a center spot) decreases, and light which is not focused on the center is distributed on a periphery as flare. When the disc tilt is 0.7 degree, the peak intensity decreases by approximately 18% as compared with a case where the disc tilt is 0 degree. Further, a diameter of the center spot becomes larger, and reproduction resolution decreases. The flare formed on the periphery has little resolution in reproducing the recording mark.

Figure 4:
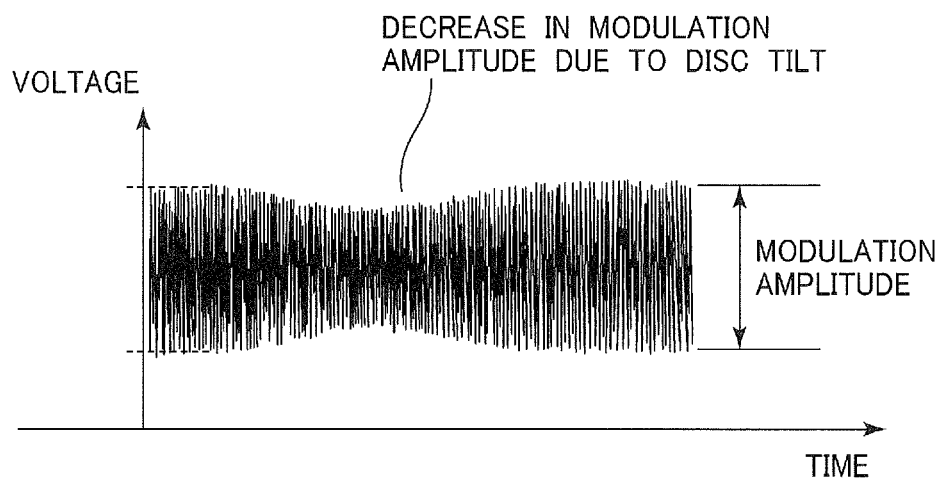
[FIG. 4] is a view showing an example of a waveform of reproduction signal outputted from a modulation amplitude detection circuit 9 when the disc tilt occurs.

FIG. 4 is a view showing an example of a waveform of the reproduction signal outputted from the light receiving element 8 when the comatic aberration occurs due to the disc tilt. When the comatic aberration occurs due to the disc tilt, a portion where the modulation amplitude decreases appears in the waveform of the reproduction signal as shown by an arrow in FIG. 4.

In contrast, even when the comatic aberration occurs due to the disc tilt, a change in the total amount of light received by the light receiving element 8 is little. This is because the light of the flare is reflected by the optical disc 6, and most of such light is incident on the light receiving element 8.

Figure 5:
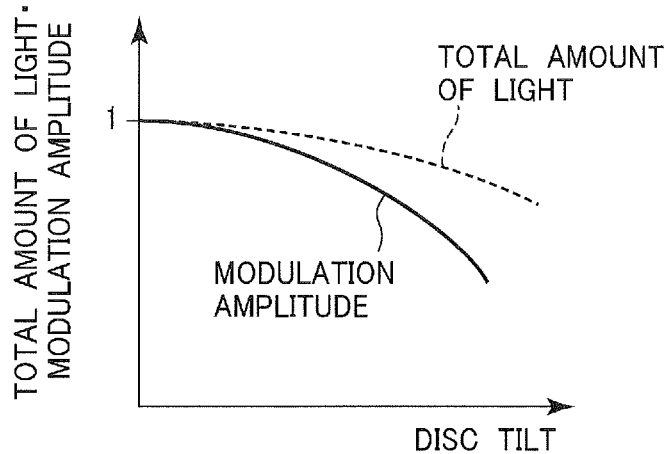
[FIG. 5] is a view showing a change in a total amount of light and a change in modulation amplitude when the disc tilt occurs in contrast with each other.

FIG. 5 is a view showing a change in the total amount of light received by the light receiving element 8 and a change in modulation amplitude of the reproduction signal when the comatic aberration occurs due to the disc tilt. FIG. 5 shows changing rates of the total amount of light and the modulation amplitude with respect to those when the disc tilt is 0 degree which are respectively defined as 1. Generally, the total amount of light reflected by the optical disc 6 and incident on the light receiving element 8 shows little change when the disc tilt (the comatic aberration) is within an assumed range in the optical disc device as shown by a dashed line in FIG. 5. In particular, when the disc tilt is relatively small, the total amount of light incident on the light receiving element 8 hardly changes. In contrast, as shown by a solid line in FIG. 5, the change in the modulation amplitude of the waveform of the recording signal is large as compared with the change in the total amount of light incident on the light receiving element 8.

Figure 6:
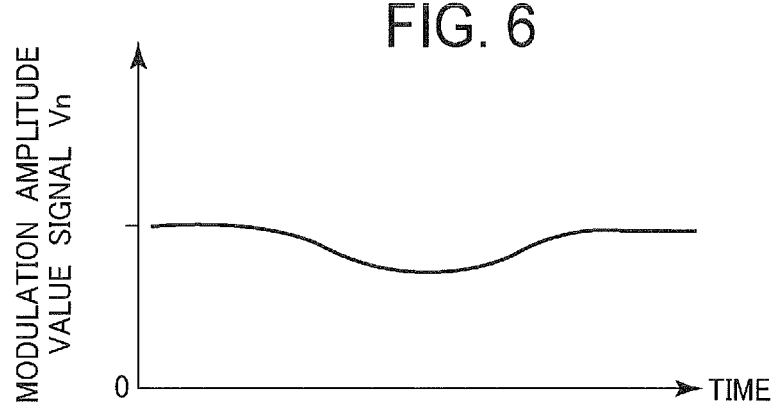
[FIG. 6] is a view showing an example of envelope signal of the modulation amplitude outputted by the modulation amplitude detection circuit 9.

In Embodiment 1, the reproduction signal of the recording data of the optical disc 6 detected by the light receiving element 8 is inputted into the modulation amplitude detection circuit 9 as shown in FIG. 1. The modulation amplitude detection circuit 9 creates modulation amplitude value signal Vn representing a changing amount of envelope signal of the modulation amplitude of the reproduction signal. FIG. 6 is a view showing a waveform of the modulation amplitude value signal Vn that the modulation amplitude detection circuit 9 creates based on the reproduction signal shown in FIG. 4. As shown in FIG. 6, the modulation amplitude value signal Vn represents an envelope (i.e., an envelope curve) of the modulation amplitude of the reproduction signal.

Figure 7:
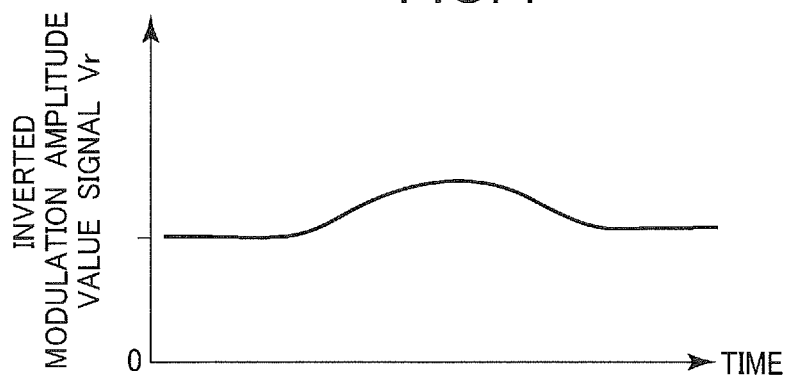
[FIG. 7] is a view showing an example of inverted modulation amplitude value signal outputted by an inverting circuit 10.

The modulation amplitude value signal Vn created by the modulation amplitude detection circuit 9 is inputted into the inverting circuit 10, and is converted into inverted modulation amplitude value signal Vr that shows an opposite change to the envelope signal of the modulation amplitude as shown in FIG. 7.

The inverted modulation amplitude value signal Vr created by the inverting circuit 10 is inputted into the laser driving circuit 11 that supplies the driving current Iop to the semiconductor laser 1. The laser driving circuit 11 determines the driving current Iop so as to keep constant (Vm+kv×Vr)/Vop obtained from the inputted inverted modulation amplitude value signal Vr, a voltage Vm converted from a monitor current Im corresponding to a light emission amount detected by a back-monitor light receiving element (not shown) of the semiconductor laser 1, and a voltage Vop converted from the driving current Iop. Here, kv is a fixed gain, and is so set that fluctuation in the modulation amplitude of the reproduction signal becomes small.

In this regard, it is also possible to use a detected current of a front-monitor light receiving element (not shown) provided so as to detect part of the light beam 2 emitted by the semiconductor laser 1 instead of the monitor current Im of the back-monitor light receiving element of the semiconductor laser 1.

Further, it is also possible that the laser driving circuit 11 creates the driving current Iop+Vr/Ri and supplies the created current to the semiconductor laser 1. Here, Ri is a fixed resistance value for converting Vr into a current value, and is so set that the fluctuation in the modulation amplitude of the reproduction signal becomes small. In this case, it is unnecessary to use the monitor current obtained from the back-monitor light receiving element (or the front-monitor light receiving element) of the semiconductor laser 1.

Further, it is also possible to determine the driving current Iop so as to keep constant a ratio Vr/Vop obtained from Vop which is a voltage converted from the driving current Iop of the semiconductor laser 1. In this case, it is also unnecessary to use the monitor current Im.

Further, it is also possible to determine the driving current Iop based on the modulation amplitude value signal Vn created by the modulation amplitude detection circuit 9 instead of using the inverted modulation amplitude value signal Vr created by the inverting circuit 10. In this case, for example, it is possible that the laser driving circuit 11 creates the driving current Iop−Vn/Ri and supplies the created current to the semiconductor laser 1. Alternatively, it is also possible to determine the driving current Iop so as to keep constant a ratio Vn/Vop. In this case, it becomes unnecessary to provide the inverting circuit 10.

As described above, according to Embodiment 1 of the present invention, the driving current Iop of the laser driving circuit 11 is controlled based on the change in the modulation amplitude of the reproduction signal. Therefore, even when the comatic aberration occurs due to the disc tilt, the decrease in the peak intensity of the focused light spot can be suppressed, and the peak intensity required for generating the super-resolution effect can be maintained. As a result, it becomes possible to reproduce the super-resolution optical disc 6 with higher quality.

In particular, since the driving current Iop is controlled based on the change in the modulation amplitude of the reproduction signal, it becomes possible to respond to the decrease in the peak intensity of the focused light spot resulting from a relatively small disc tilt (i.e., the comatic aberration caused thereby) that does not appear in the change in the total amount of light incident on the light receiving element 8.

Further, by using the modulation amplitude value signal Vn which is the envelope signal of the reproduction signal or the inverted modulation amplitude value signal Vr which is inverted signal of the modulation amplitude value signal Vn, the control the driving current Iop based on the change in the modulation amplitude of the reproduction signal can be realized without requiring complicated control.

Embodiment 2

Figure 8:
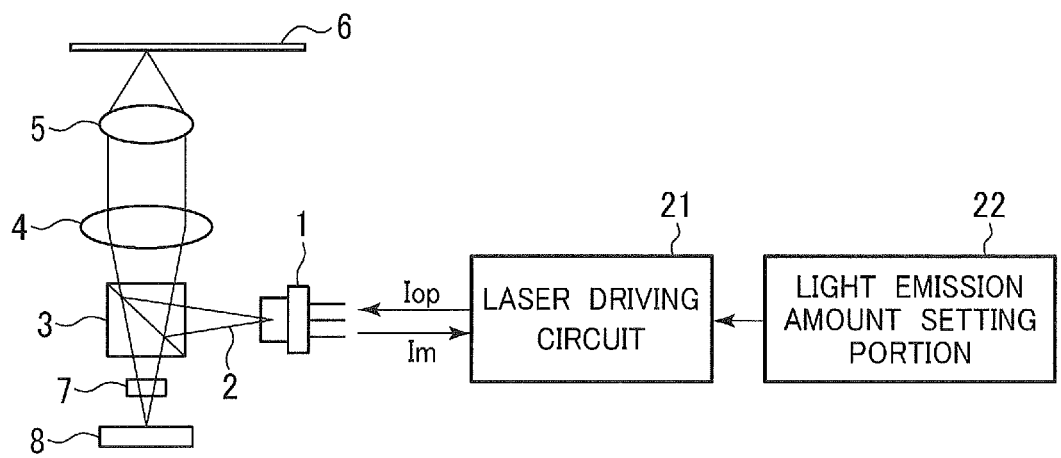
[FIG. 8] is a view showing a configuration of an optical disc device according to Embodiment 2 of the present invention.

Next, Embodiment 2 of the present invention will be described. FIG. 8 is a view showing a configuration of the optical disc device according to Embodiment 2. In FIG. 8, components that are the same as those of the optical disc device of Embodiment 1 (FIG. 1) are assigned with the same reference numerals.

The optical disc device of Embodiment 2 includes the semiconductor laser 1, the prism 3, the collimator lens 4, the objective lens 5, the sensor optical element 7 and the light receiving element 8 all of which were described in Embodiment 1.

The optical disc device of Embodiment 2 further includes a laser driving circuit 21 that supplies the driving current Iop to the semiconductor laser 1 to cause the semiconductor laser 1 to emit the light beam 2, and a light emission amount setting portion (i.e., a light emission amount control means) 22 that controls a light emission amount of the semiconductor laser 1 by the laser driving circuit 21. In this regard, the modulation amplitude detection circuit 9 and the inverting circuit 10 (FIG. 1) described in Embodiment 1 are not provided.

Generally, in the super-resolution optical disc, when the peak intensity at the center of the focused light spot is higher than or equal to a certain threshold, the optical property of the super-resolution layer changes at a portion where the peak intensity is high, so that the super-resolution effect is obtained. However, if the peak intensity at the center of the focused light spot decreases to be almost the same as or lower than the threshold, the super-resolution effect significantly decreases, and a reproduction performance decreases.

Figure 9:
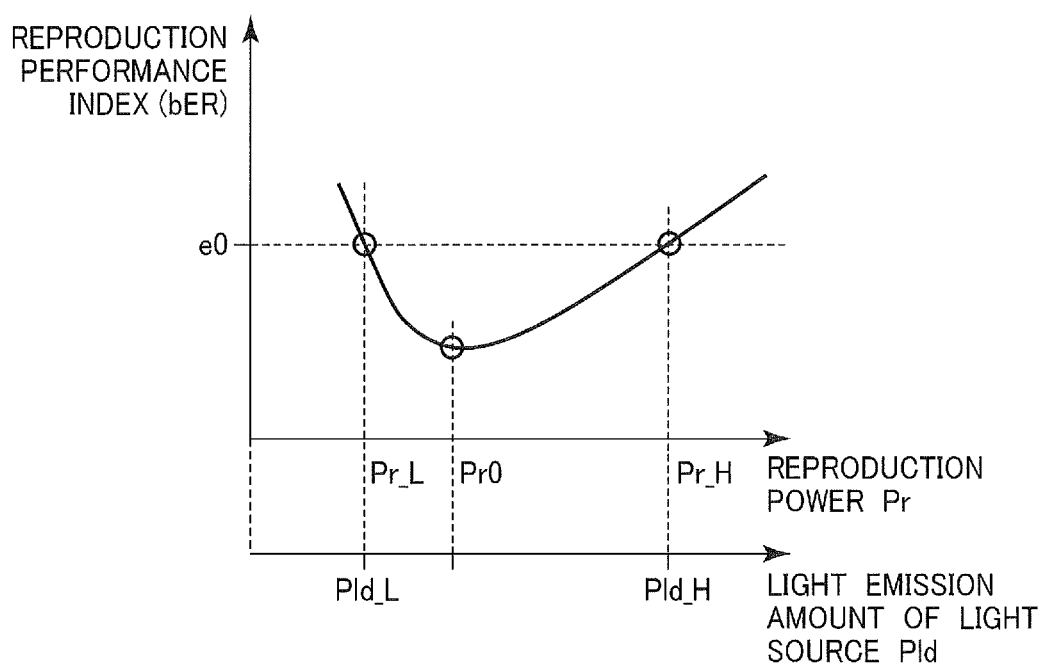
[FIG. 9] is a graph showing a change in a reproduction performance with respect to changes in a light emission amount of a semiconductor laser and an amount of light of a focused light spot (a reproduction power).

FIG. 9 is a graph showing a change in the reproduction performance with respect to a change in a reproduction power Pr of the super-resolution optical disc. The reproduction power Pr is defined as an amount of light emitted by the objective lens 5 (i.e., an amount of light at the focused light spot on the information recording surface) out of a light emission amount Pld of the light source (the semiconductor laser 1). Further, in FIG. 9, a vertical axis indicates a bit error rate (bER) as an index indicating the reproduction performance. In this regard, the index indicating the reproduction performance is not limited to bER. It is also possible to use other indexes, for example, a symbol error rate (SER), a jitter, or an i-MLSE value.

As shown in FIG. 9, the super-resolution optical disc has a minimum power Pr0 at which the bER becomes the minimum (i.e., the best reproduction performance is obtained). The super-resolution optical disc has a dependence on the reproduction power in which the bER increases in an asymmetric manner when the reproduction power changes to a low-power side (decreases) or changes to a high-power side (increases) with respect to the reproduction power Pr0. A predetermined value that defines an allowable limit is expressed to as e0. The reproduction power Pr on the low-power side at which the bER is e0 is expressed as Pr_L. The reproduction power Pr on the high-power side at which the bER is e0 is expressed as Pr_H. In other words, the reproduction powers Pr_L and Pr_H are respectively a lower limit and an upper limit of the reproduction power at which an excellent reproduction performance (within an allowable range) is obtained. The dependence on the reproduction power is property that a conventional BD-standard optical disc with no super-resolution layer does not have.

As the predetermine value e0, it is possible to use an allowance index value used in deciding whether various optical discs can be reproduced, or deciding a quality of the optical disc. For example, when the predetermined value e0 is the bER, the predetermined value e0 is $3 \times 10^{-4}$. When the predetermined value e0 is the SER, the predetermined value e0 is $2 \times 10^{-3}$.

The amount of light entering an entrance pupil of the objective lens 5 is determined by an amount of light in light flux between a light emitting point of the semiconductor laser 1 and an entrance pupil diameter of the objective lens 5. The reproduction power Pr is the light emission amount Pld of the semiconductor laser 1 multiplied by an emission efficiency η of the objective lens 5. A horizontal axis indicating the reproduction power Pr, and another horizontal axis indicating the light emission amount Pld of the semiconductor laser 1 are shown in FIG. 9. The reproduction power Pr_L of the low-power side and the reproduction power Pr_H of the high-power side corresponding to the above described predetermined value e0 respectively correspond to the light emission amounts Pld_L and Pld_H of the semiconductor laser 1. In other words, Pld_L and Pld_H are respectively a lower limit and an upper limit of the light emission amount at which an excellent reproduction performance (within an allowable range) is obtained.

As described above, the optical disc 6 is held and rotated by the turntable rotated by the disc rotation motor. In this state, during the rotation of the optical disc 6, there are cases where the disc tilt with respect to the direction of the optical axis of the objective lens 5 occurs due to the warpage of the optical disc 6, the swing of the rotation axis of the disc rotation motor, or the insufficient fixing or misalignment of the optical disc 6 with respect to the turntable. The disc tilt causes the comatic aberration of the light beam 2, and the light intensity distribution of the focused light spot formed on the information recording layer changes from the ideal light intensity distribution.

The result of simulation of the focused light spot when the comatic aberration occurs due to the disc tilt is as was described with reference to FIG. 3. As was described with reference to FIG. 3, when the disc tilt is 0.7 degree, the peak intensity decreases by about 18% with respect to the case where the disc tilt is 0 degree. As a result, there are cases where the amount of light (the reproduction power) of the focused light spot on the information recording surface falls below Pr_L, and the performance within the allowable range cannot be exerted, i.e., for example, the bER may exceed $3 \times 10^{-4}$.

For this reason, in this embodiment, the light emission amount setting portion 22 controls the light emission amount Pld of the semiconductor laser 1 by the laser driving circuit 21 as described below.

That is, a decrease rate D of the peak intensity of the focused light spot (about 18% when the disc tilt is 0.7 degree) is determined based on the comatic aberration calculated from an assumed disc tilt angle (i.e., a disc tilt amount) θ which is assumed in the optical disc device and a thickness t of a light transmitting layer of the optical disc 6. Then, the light emission amount Pld_L on the low-power side is added to a product D×Pld_L of the above described decrease rate D and the light emission amount Pld_L, so that (1+D)×Pld_L is calculated. The laser driving circuit 21 supplies the driving current Iop to the semiconductor laser 1 so that the light emission amount Pld of the semiconductor laser 1 is greater than or equal to (1+D)×Pld_L.

With such a control, even when the disc tilt angle θ assumed in the optical disc device occurs, the peak intensity required to generate the super-resolution effect can be ensured, and the reproduction performance within the allowable range can be exerted (for example, the bER is limited to be less than or equal to $3 \times 10^{-4}$, or the SER is limited to be less than or equal to $2 \times 10^{-3}$).

In this regard, it is unlikely that (1+D)×Pld_L is greater than Pld_H. This is because of the asymmetry as shown in FIG. 9 where the change in the performance is gradual on the high-power side, but is steep on the low-power side with respect to the reproduction power Pr0 at which the best reproduction performance (for example, the bER) is obtained (in other words, an effect on the reproduction performance is larger when the reproduction power is insufficient than when the reproduction power is excessively large).

However, a possibility that (1+D)×Pld_L is greater than Pld_H is not zero. Therefore, when (1+D)×Pld_L is greater than Pld_H, the light emission amount setting portion 22 sets the light emission amount to Pld_H instead of (1+D)×Pld_L.

As described above, according to Embodiment 2 of the present invention, the laser driving circuit 21 controls the light emission amount of the semiconductor laser 1 based on the decrease rate D of the peak intensity of the focused light spot determined based on the comatic aberration calculated from the assumed disc tilt angle θ and the thickness t of the light transmitting layer of the optical disc 6. Therefore, even when the assumed disc tilt angle θ occurs, the peak intensity required for generating the super-resolution effect can be ensured, and the reproduction performance within the allowable range can be exerted.

In particular, when the lower limit of the light emission amount at which the excellent reproduction performance (within the allowable range) is obtained is expressed as Pld_L, the semiconductor laser 1 is controlled so that the light emission amount Pld of the semiconductor laser 1 is greater than or equal to (1+D)×Pld_L. Therefore, an excellent reproduction performance can be exerted while compensating the decrease in the peak intensity of the focused light spot caused by the comatic aberration (for example, about 18% when the disc tilt is 0.7 degree).

Embodiment 3

FIG. 10 is a view showing a configuration of an optical disc device according to Embodiment 3. In FIG. 10, components that are the same as those of the optical disc device of Embodiment 1 and Embodiment 2 are assigned with the same reference numerals.

The optical disc device of Embodiment 3 includes the semiconductor laser 1, the prism 3, the collimator lens 4, the objective lens 5, the sensor optical element 7 and the light receiving element 8 which were described in Embodiment 1.

The optical disc device of Embodiment 3 further includes a laser driving circuit 31 that supplies the driving current Iop to the semiconductor laser 1 to cause the semiconductor laser 1 to emit the light beam 2, and a light emission amount setting portion (a light emission amount control means) 32 that controls a light emission amount of the semiconductor laser 1 by the laser driving circuit 31. In this regard, the modulation amplitude detection circuit 9 and the inverting circuit 10 (FIG. 1) described in Embodiment 1 are not provided.

The optical disc device of Embodiment 3 include a collimator lens driving device (an optical element driving means) 30 configured to move the collimator lens 4 in a direction of an optical axis to adjust a position of the collimator lens 4 in the direction of the optical axis. When the objective lens with a relatively large NA of 0.85 or more is used as in an optical disc device that performs recording and reproducing using a BD-standard optical disc, an influence of a spherical aberration resulting from a difference in the thickness of the light transmitting layer of the optical disc becomes large. Therefore, the collimator lens driving device 30 is used to correct the spherical aberration according to the thickness of the light transmitting layer of the optical disc.

Embodiment 3 relates to a control of the light emission amount of the semiconductor laser 1 in the optical disc device capable of recording and reproducing using a multilayer super-resolution optical disc 60 having a plurality of information recording layers.

FIG. 11 is a view showing a schematic configuration of the multilayer super-resolution optical disc 60. For ease of explanation, the number N of the information recording layers is 3. The information recording layers are referred to information recording layers L2, L1 and L0 in this order from an incident side of the light from the objective lens 5. A thickness of a light transmitting layer (i.e., a cover layer 6c) on the incident-most side is expressed as tc. A thickness of a light transmitting layer 6b between the recording layers L2 and L1 is expressed as t1. A thickness of a light transmitting layer 6a between the recording layers L1 and L0 is expressed as t2. In this regard, the super-resolution layer is omitted in FIG. 11. It is needless to say that the number N of the information recording layers is not limited to 3.

In the multilayer optical disc 60, thicknesses of the light transmitting layers from a disc surface to respective information recording layers L2, L1 and L0 are different. That is, the thickness of the light transmitting layer from the disc surface to the information recording layer L2 is tc, while the thickness of the light transmitting layer from the disc surface to the information recording layer L1 is tc+t1. The thickness of the light transmitting layer from the disc surface to the information recording layer L0 is tc+t1+t2. Therefore, the collimator lens driving device 30 moves the collimator lens 4 in the direction of the optical axis according to the thickness of the light transmitting layer to thereby correct spherical aberration, so that an optimum focused light spot is formed on the information recording layer.

Figure 13:
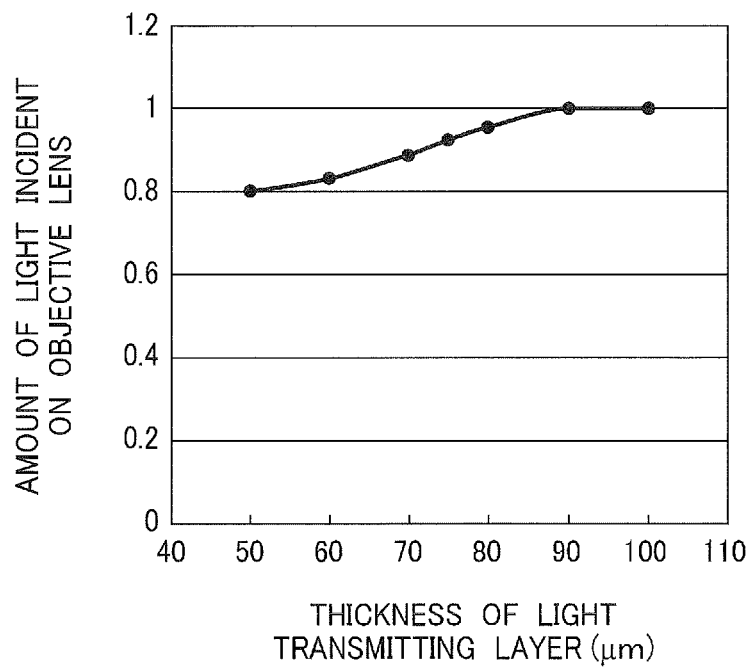
[FIG. 13] is a graph showing a change in the amount of light entering the entrance pupil of the objective lens 5 with respect to a thickness of a light transmitting layer of the multilayer super-resolution optical disc.

FIG. 12 is a schematic view for illustrating an amount of light entering the entrance pupil of the objective lens 5 when the collimator lens 4 is moved in the direction of the optical axis. FIGS. 12(*a*), 12(*b*) and 12(*c*) schematically show respective positions of the collimator lens 4 correcting the spherical aberration on the information recording layers L0, L1 and L2. FIG. 13 is a graph showing a change in the amount of light entering the entrance pupil of the objective lens 5 with respect to the thickness t of the light transmitting layer.

When accessing the information recording layers L2, L1 and L0 (FIGS. 12(*c*), 12(*b*) and 12(*a*)) in this order, the thickness t of the light transmitting layer from the disc surface to the information recording layer to be accessed increases. Accordingly, the collimator lens driving device 30 moves the collimator lens 4 along the optical axis in the direction away from the objective lens 5. As a result, the amount of light entering the entrance pupil of the objective lens 5 monotonically increases as shown in FIG. 13.

Therefore, if the light emission amount of the semiconductor laser 1 is kept constant, a change in the peak intensity of the focused light spot occurs, since the reproduction power Pr differs according to the information recording layers to be accessed. Therefore, there is a possibility that the peak intensity required to generate the super-resolution effect cannot be obtained.

In order to prevent fluctuation in the amount of light entering the entrance pupil of the objective lens 5, the light emission amount setting portion 32 controls the light emission amount Pld of the semiconductor laser 1 by the laser driving circuit 31 as described below.

That is, a fluctuation rate P(t) of the amount of light entering the entrance pupil of the objective lens 5 according to the thickness t of the light transmitting layer from the disc surface to the information recording surface preliminarily calculated based on design condition of an optical system is added to a product P(t)×Pld0 of the fluctuation rate P(t) and a reference light emission amount Pld0, so that (1+P(t))×Pld0 is calculated. The reference light emission amount Pld0 indicates a light emission amount of the semiconductor laser 1 initially set in the optical disc device at which an excellent reproduction performance is exerted (for example, the bER is less than or equal to the predetermined value e0) in a state where the spherical aberration with respect to the thickness t of the light transmitting layer is corrected by adjusting the position of the collimator lens 4.

In this way, the light emission amount of the semiconductor laser 1 is determined according to the information recording layer (L0, L1 and L2) to be accessed. The laser driving circuit 31 supplies the driving current Iop to the semiconductor laser 1 so that the light emission amount Pld of the semiconductor laser 1 is greater than or equal to (1+P(t))×Pld0.

The fluctuation rate P(t) is a function that monotonically increases according to the thickness t of the light transmitting layer. For example, the fluctuation rate P(t) is expressed as a linear function P(t)=a×t (here, a is a positive constant) or a quadratic function P(t)=b×t$^2$+c×t+d. Here, b, c and d are constants (b is a positive constant). In this regard, P(t) can be a cubic or higher order function of the thickness t of the light transmitting layer.

As just described, by controlling the light emission amount Pld of the semiconductor laser 1 so that the light emission amount Pld equals to (1+P(t))×Pld0, the fluctuation of the reproduction power Pr resulting from the movement of the collimator lens 4 can be suppressed, and the peak intensity of the focused light spot on each of the information recording layers L0, L1 and L2 of the multilayer super-resolution optical disc 60 can be kept to the intensity required for generating the super-resolution effect.

Further, the light emission amount setting portion 32 sets the light emission amount Pld of the semiconductor laser 1 so as to prevent the decrease in the peak intensity of the focused light spot resulting from the comatic aberration due to the disc tilt of the multilayer optical disc 60. This will be described below.

It is known that a comatic aberration amount is proportional to a third-order comatic aberration coefficient W31 expressed by the following general expression (1), and is inversely proportional to a wavelength λ of the laser light.

$$W_{31} \cong -\frac{t}{2} \times \frac{(n^2-1)\theta}{n^3} \times (NA)^3 \qquad (1)$$

In the equation (1), θ is a disc tilt angle with respect to the optical axis of the objective lens 5 (i.e., an inclination angle of the multilayer super-resolution optical disc 60). n is a refractive index of the light transmitting layer covering the information recording layer of the optical disc 60. NA is a numerical aperture of the objective lens 5. t is the thickness of the light transmission layer from the disc surface to the information recording layer as described above.

From the equation (1), the comatic aberration amount increase in proportion to the thickness t of the light transmitting layer even when the disc tilt angle is the same. Therefore, the peak intensity of the focused light spot monotonically decreases according to the thickness t of the light transmitting layer as the simulation value shown in FIG. 14.

In order to prevent the above described fluctuation of the amount of light entering the entrance pupil of the objective lens 5, the light emission amount setting portion 32 controls the light emission amount Pld of the semiconductor laser 1 by the laser driving circuit 31 as described below.

That is, a decrease rate Dm of the peak intensity of the focused light spot is determined based on the comatic aberration calculated from the comatic aberration coefficient W31 of the equation (1) based on the disc tilt angle θ assumed in the optical disc device and the thickness t of the light transmitting layer. Then, as was described in Embodiment 2, (1+Dm)×Pld_L is calculated by adding the laser light emission amount Pld_L on the low-power side to the product Dm×Pld_L of the decrease rate Dm and the light emission amount Pld_L. The laser driving circuit 31 drives the semiconductor laser 1 so that the light emission amount Pld of the semiconductor 1 is greater than or equal to (1+Dm)×Pld_L.

That is, in Embodiment 3, a larger one of
(1+P(t))×Pld0 and
(1+Dm)×Pld_L
is chosen, and is set to Pld_A. The light emission amount Pld of the semiconductor laser 1 is controlled so as to be greater than or equal to Pld_A. Therefore, the fluctuation of the reproduction power Pr resulting from the movement of the collimator lens 4 is suppressed. Further, the decrease in the peak intensity of the focused light spot resulting from the comatic aberration due to the disc tilt can be suppressed, and the reproduction performance can be maintained within the allowable range (for example, the bER is limited to be less than or equal to $3\times10^{-4}$ or the like).

In this regard, as was described in Embodiment 2, when the value of Pld_A is greater than the value of Pld_H, the light emission amount Pld is set to Pld_H instead of Pld_A.

As described above, according to Embodiment 3 of the present invention, the light emission amount Pld of the semiconductor laser 1 is controlled depending on the information recording layer to be accessed, based on the fluctuation rate P(t) of the amount of light entering the entrance pupil of the objective lens 5 according to the thickness t of the light transmitting layer from the disc surface to the information recording layer. Therefore, it is possible to suppress the fluctuation of the reproduction power Pr resulting from the movement of the collimator lens 4 by the collimator lens driving device 30. Further, the peak intensity of the focused light spot at each of the information recording layers L0, L1 and L2 of the multilayer super-resolution optical disc 60 can be kept at the peak intensity at which the super-resolution effect is generated.

In addition, the light emission amount of the semiconductor laser 1 is controlled based on the decrease rate Dm of the peak intensity of the focused light spot determined based on the assumed disc tilt angle θ and the thickness t of the light transmitting layer of the optical disc 60. Therefore, even when the disc tilt occurs, the peak intensity required to generate the super-resolution effect can be ensured, and the reproduction performance within the allowable range can be exerted.

Here, it has been described that the collimator lens driving device 30 moves the collimator lens 4 in the direction of the optical axis. However, it is also possible to move another element if the spherical aberration resulting from the thickness of the light transmitting layer of the optical disc 60 can be corrected.

Modification

A modification of Embodiment 3 relates to an optical disc device in which the laser driving circuit 11 drives the semiconductor laser 1 so that a ratio between the driving current Iop and the monitor current Im obtained from the back-monitor light emitting element is constant.

Figure 14:
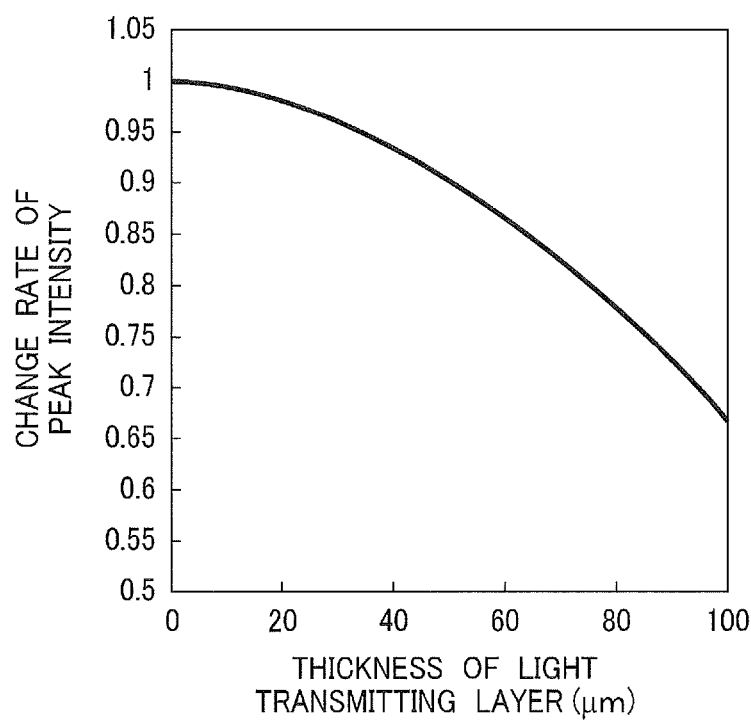
[FIG. 14] is a graph showing a change in a peak intensity of a focused light spot with respect to the thickness of the light transmitting layer of the multilayer super-resolution optical disc when a disc tilt occurs.

As described above, according to the increase in the thickness t of the light transmitting layer of the multilayer super-resolution optical disc 60, the amount of light entering the entrance pupil of the objective lens 5 increases (FIG. 13), and the decrease in the peak intensity of the focused light spot at the occurrence of the disc tilt becomes larger (FIG. 14). Therefore, in this modification, in a state where the recording layer that maximizes the thickness of the light transmitting layer (for example, the information recording layer L0 of FIG. 11) is accessed, the light emission amount of the semiconductor laser 1 is set so as to obtain the peak intensity required for generating the super-resolution effect in consideration of the decrease in the peak intensity due to the disc tilt (FIG. 14). In other words, this modification is based on utilization of a feature that a curve shown in FIG. 13 and a curve shown in FIG. 14 show mutually opposite tendencies for the change in the thickness t of the light transmitting layer.

When the recording layer (for example, the recording layer L1 or L2 shown in FIG. 11) with which the thickness of the light transmitting layer is thin is accessed, the amount of light entering the entrance pupil of the objective lens 5 decreases, but the decrease in the peak intensity of the focused light spot at the occurrence of the disc tilt becomes smaller. Therefore, a cancelling effect is obtained to some extent. As a result, while it is difficult to surely ensure the peak intensity for generating the super-resolution effect as in the above described Embodiment 3, the decrease in the peak intensity can be suppressed to some extent.

Embodiment 4

Figure 15:
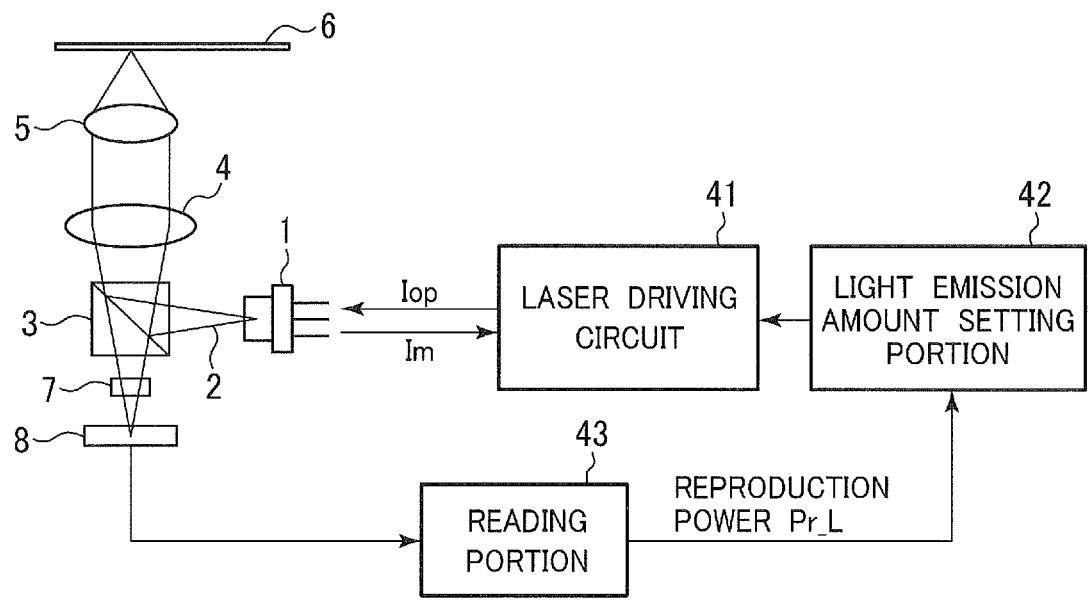
[FIG. 15] is a view showing a configuration of an optical disc device according to Embodiment 4 of the present invention.

FIG. 15 is a view showing a configuration of an optical disc device according to Embodiment 4. In FIG. 15, components that are the same as those of Embodiments 1 through 3 are assigned with the same reference numerals.

The optical disc device of Embodiment 4 includes the semiconductor laser 1, the prism 3, the collimator lens 4, the objective lens 5, the sensor optical element 7 and the light receiving element 8 which were described in Embodiment 1.

The optical disc device of Embodiment 4 further includes a laser driving circuit 41 that supplies the driving current Iop to the semiconductor laser 1 to cause the semiconductor laser 1 to emit the light beam 2, and a light emission amount setting portion 42 that controls a light emission amount of the semiconductor laser 1 by the laser driving circuit 41.

In Embodiment 4, information on the reproducing power Pr is stored in the optical disc 6, together with an identification ID for identifying a type of the optical disc or a type of the super-resolution layer. Further, the optical disc device includes a reading portion (i.e., a reading means) 43 that reads out the information on the reproduction power Pr from the optical disc and notifies the light emitting amount setting portion 42 of the information. The light emitting amount setting portion 42 and the reading portion 43 constitute a light emitting amount control means.

There are cases where the reproduction powers Pr_L and Pr_H at which the predetermine value e0 serving as a reference of the reproduction performance of the optical disk 6 (for example, the bER is less than or equal to $3 \times 10^{-4}$) is obtained vary depending on a type or composition ratio of material of the super-resolution layer of the super-resolution optical disc.

Therefore, in this embodiment, the reproduction power Pr_L on the low-power side at which the predetermined value e0 (serving as a reference of the reproduction performance) is obtained is stored in an information management area 63 of the optical disc 6. The optical disc 6 includes a data area 61 for storing user data, a buffer area 62 and the information management area 63 in this order from an outer circumference. The reproduction power Pr_L is stored in the information management area 63.

When performing recording and reproducing using such a super-resolution optical disc, the reading unit 43 of the optical disc device reads out the reproduction power Pr_L from the information management area 63, and notifies the light emitting amount setting portion 42. Based on the read reproduction power Pr_L, the light emitting amount setting portion 42 sets the light emission amount of the semiconductor laser 1 by the laser driving circuit 41 as was described in Embodiments 2 and 3.

In this regard, when the information management area 63 of the optical disc 6 includes only long marks (i.e., the recording mark larger than a diffraction limit), the information management area 63 can be read even with a reproduction power less than or equal to the reproduction power required for generating the super-resolution effect. Therefore, when reading the reproduction power Pr_L from the information management area 63, the light emission amount of the semiconductor laser 1 can be set to the light emission amount at which a relatively lower reproduction power can be obtained. In contrast, when reading data from the data area 61, the light emission amount of the semiconductor laser 1 is set to the light emission amount sufficient for generating the super-resolution effect.

In this way, according to Embodiment 4 of the present invention, even if there are plural types of optical discs or plural types of super-resolution layers, the decrease in the peak intensity of the focused light spot can be corrected.

Further, as the information on the reproduction power Pr_L is stored in the information management area 63 which is accessed for reading prior to reproduction of data in the data area 61, a time until the optical disc device starts reproduction can be shortened.

It is also possible to apply Embodiment 4 to either of the described above Embodiments 2 and 3. That is, the optical disc may have a single information recording layer or a plurality of information recording layers. Further, the collimator lens driving device 30 may be provided or not.

Embodiment 5

In the above described Embodiment 4, the optical disc stores the information on the reproduction power Pr, i.e., the information on the reproduction power Pr_L on the low-power side at which at least the predetermined value e0 serving as a reference of the reproduction performance is obtained. Further, the optical disc device reads out the information on the reproduction power Pr from the optical disc and controls the reproduction power. In contrast, in Embodiment 5, the optical disc stores information on the reproduction power Pr, i.e., information on an upper limit and a lower limit of the reproduction power Pr (i.e., allowable limits of the reproduction performance of the optical disc) or information on desirable reproduction power. The optical disc device reads out the information on the reproduction power Pr from the optical disc and controls the reproduction power.

Figure 17:
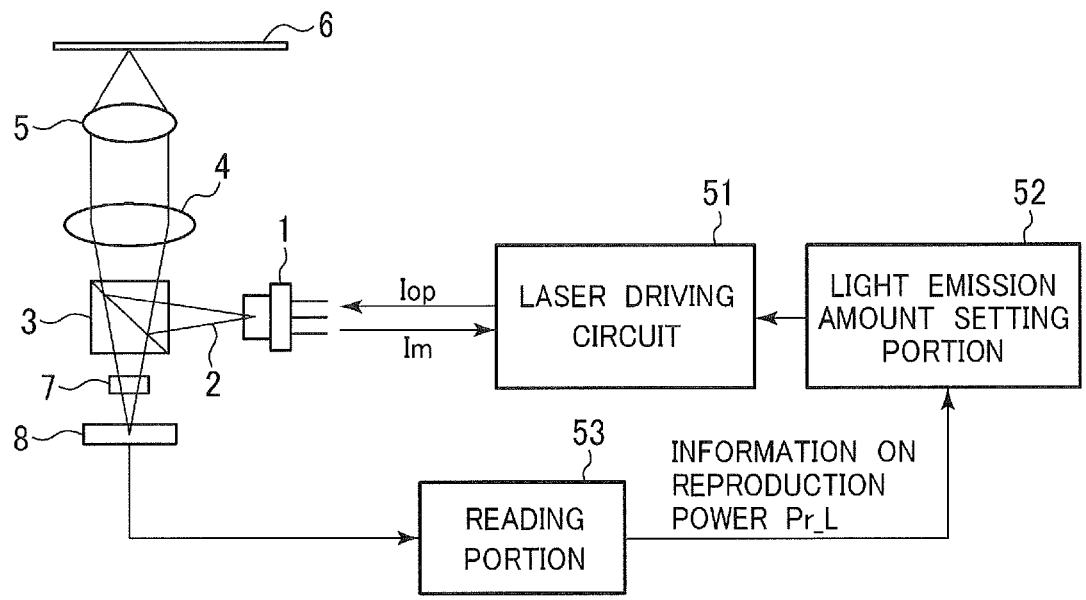
[FIG. 17] is a view showing a configuration of an optical disc device according to Embodiment 5 of the present invention.

FIG. 17 is a view showing a configuration of an optical disc device according to Embodiment 5. In FIG. 17, components that are the same as those of the optical disc device of Embodiments 1 through 4 are assigned with the same reference numerals.

The optical disc device of Embodiment 5 includes the semiconductor laser 1, the prism 3, the collimator lens 4, the objective lens 5, the sensor optical element 7 and the light receiving element 8 which were described in Embodiment 1.

The optical disc device of Embodiment 5 further includes a laser driving circuit 51 that supplies the driving current Iop to the semiconductor laser 1 to cause the semiconductor laser 1 to emit the light beam 2, and a light emission amount setting portion 52 that controls a light emission amount of the semiconductor laser 1 by the laser driving circuit 51.

In Embodiment 5, the optical disc 6 stores information on the reproduction power Pr together with, for example, the identification ID indentifying the type the optical disc or the type of the super-resolution layer. In addition, the optical disc device includes a reading portion (i.e., a reading means) 53 that reads out the information on the reproduction power Pr from the optical disc and notifies the light emission amount setting unit 52 of the information. The light emission amount setting portion 52 and the reading portion 53 constitute a light emission amount control means.

Figure 16:
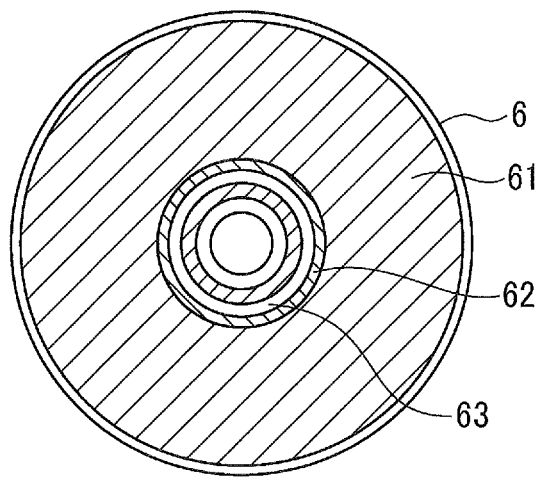
[FIG. 16] is a view showing a schematic configuration of a super-resolution optical disc device according to Embodiment 4.

As was described with reference to FIG. 16, the optical disc 6 includes the data area 61, the buffer area 62, and the information management area 63 in this order from an outer circumference. The information on the reproduction power Pr is stored in the information management area 63. In this embodiment, the information on the reproduction power Pr includes at least one of information on the upper and lower limits of the reproduction power Pr (serving as allowable limits of the reproduction performance of the optical disc) or information on the desirable reproducing power.

When performing recording and reproducing using such a super-resolution optical disc, the reading portion 53 of the optical disc device reads out the information on the reproduction power Pr from the information management area 63, and notifies the light emission amount setting unit 52. The light emission amount setting unit 52 sets the light emission amount of the semiconductor laser 1 via the laser driving circuit 51 based on the read information as described in Embodiments 2 and 3.

Next, description will be made of the information on the upper and lower limits of the reproduction power Pr serving as allowable limits of the reproduction performance of the optical disc or the desirable reproduction power. As described above, the super-resolution optical disc has a feature that the comatic aberration resulted from the disc tilt causes the peak intensity of the focused light spot to decrease, and results in deterioration of the reproduction performance using the super-resolution effect. The comatic aberration amount resulted from the disc tilt can be determined by the above described equation (1). The decrease rate of the peak intensity of the focused light spot can be calculated using this comatic aberration amount. As the disc tilt angle θ becomes larger, the comatic aberration amount increases, and the decrease rate of the peak intensity of the focused spot becomes larger.

The maximum value of the disc tilt angle θ is determined so as to ensure compatibility of the optical disc devices and compatibility of the optical discs in consideration of factors such as a warpage of the optical disc, or a displacement angle between the optical axis of the objective lens and the recording surface of the optical disc caused by a mechanical tolerance when the optical disc is set in the optical disc device. For example, the maximum value of the disc tilt angle θ is as defined by a standard of the super-resolution optical disc.

The maximum value of the disc tilt angle θ can be determined so as to ensure a performance of an overall reproduction system. In the conventional BD and DVD standard optical discs, the maximum value of the disc tilt angle θ is set to, for example, about 0.5 to 0.8 degree. In order to maintain compatibility with the conventional BD and DVD standard optical discs, it is necessary to ensure the disc tilt angle at the same level.

Reproduction performance property with respect to the reproduction power varies depending on whether the maximum disc tilt is large or small, a difference in the optical property of material of the super-resolution layer of the super-resolution optical disc, or the like. Therefore, it is necessary to consider a controlling method of the reproduction power of the optical disc device so as to correspond to the above described difference in the reproduction performance property with respect to the reproduction power.

Next, description will be made of the optical disc device that reproduces the super-resolution optical discs having different properties (i.e., reproduction performance property A shown in FIG. 18 and reproduction performance property B shown in FIG. 19) due to the difference in the maximum disc tilt, the difference in the optical property of material of the super-resolution layer of the super-resolution of the super-resolution optical disc, or the like.

Figure 18:
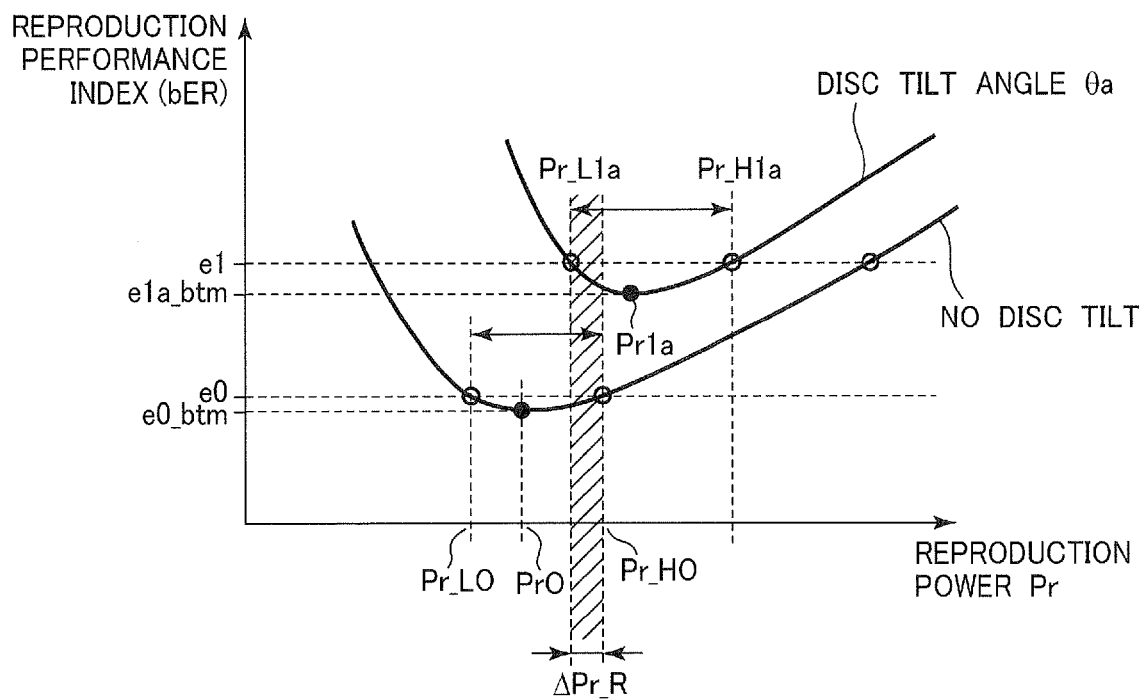

FIG. 18 is a graph showing a change in the reproduction performance of the super-resolution optical disc having the reproduction performance A with respect to a change in the reproduction power Pr. A predetermined value of a first reproduction performance defining an allowable limit of the bER when no disc tilt occurs is expressed as e0. The reproduction power Pr on the low-power side at which the bER is e0 is expressed as Pr_L0. The reproduction power Pr on the high-power side at which the bER is e0 is expressed as Pr_H0. Further, the reproduction power at which the bER is the minimum when no disc tilt occurs is expressed as Pr0, and the bER corresponding thereto is expressed as e0_btm.

In contrast, a predetermined value of a second reproduction performance defining an allowable limit of the bER when the maximum disc tilt angle θa is given is expressed as e1. The reproduction power Pr on the low-power side at which the bER is e1 is expressed as Pr_L1a. The reproduction power Pr on the high-power side at which the bER is e1 is expressed as Pr_H1a. Further, the reproduction power at which the bER is the minimum when the predetermined maximum disc tilt angle θa is given is expressed as Pr1a, and the bER corresponding thereto is expressed as e1a_btm.

Figure 19:
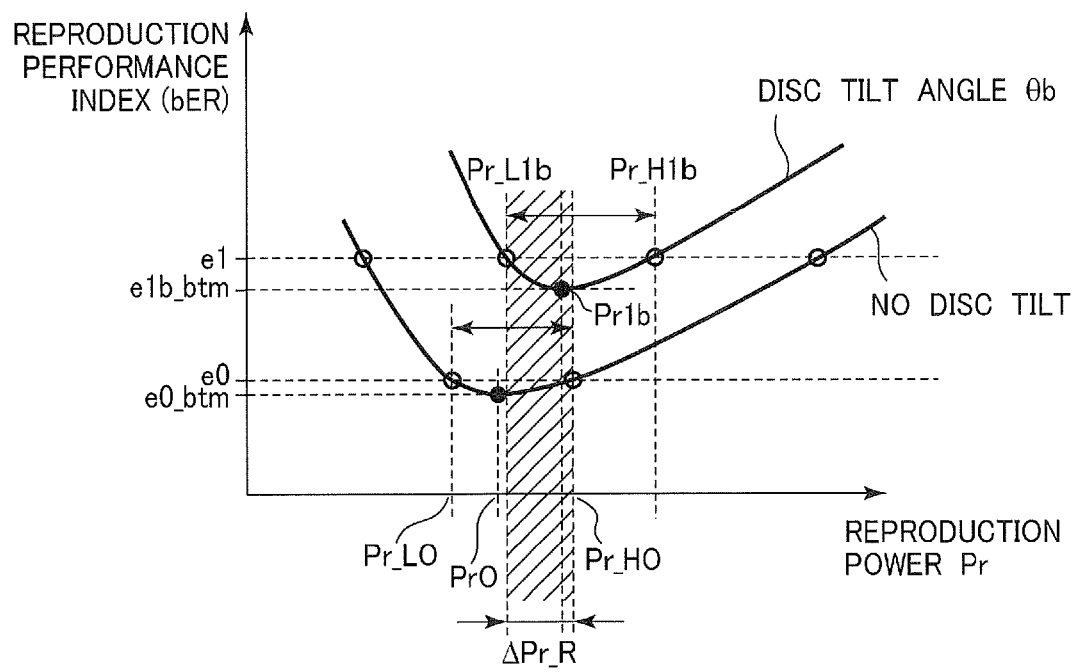
[FIG. 19] is a graph showing a change in a reproduction performance with respect to the change in the amount of light of the focused light spot (reproduction power) when a maximum value of a disc tilt is θb.

FIG. 19 is a graph showing a change in the reproduction performance of the super-resolution optical disc having the reproduction performance property B with respect to a change in the reproduction power Pr. A predetermined value of a first reproduction performance defining an allowable limit of the bER when no disc tilt occurs is expressed as e0. The reproduction power on the low-power side at which the bER is e0 is expressed as Pr_L0. The reproduction power on the high-power side at which the bER is e0 is expressed as Pr_H0. Further, the reproduction power at which the bER is the minimum when no disc tilt occurs is expressed as Pr0, and the bER corresponding thereto is expressed as e0_btm.

In contrast, a predetermined value of a second reproduction performance defining an allowable limit of the bER when the maximum disc tilt angle θb is given is expressed as e1. The reproduction power on the low-power side at which the bER is e1 is expressed as Pr_L1b. The reproduction power on the high-power side at which the bER is e1 is expressed as Pr_H1b. Further, the reproduction power at which the bER is the minimum when the maximum disc tilt angle θb is given is expressed as Pr1b, and the bER corresponding thereto is expressed as e1b_btm.

In the reproduction performance property A of FIG. 18, the reproduction power Pr1a at which the bER is the minimum when the maximum disc tilt angle θa is given is greater than the reproduction power Pr_H0 on the high-power side at which the bER is e0 when no disc tilt occurs. In contrast, in the reproduction performance property B of FIG. 19, the reproduction power Pr1b at which the bER is the minimum when the maximum disc tilt angle θb is given is less than the reproduction power Pr_H0 on the high-power side at which the bER is e0 when no disc tilt occurs.

In graphs of FIGS. 18 and 18, a vertical axis indicates the bit error rate (bER) as the index indicating the reproduction performance. However, the index indicating the reproduction performance is not limited to the bER. It is also possible to use other indexes, for example, a symbol error rate (SER), a jitter, or an i-MLSE value. Further, Pr_L1a shown in FIG. 18 and Pr_L1b shown in FIG. 19 are collectively expressed as Pr_L1. Similarly, Pr1a shown in FIG. 18 and Pr1b shown in FIG. 19 are collectively expressed as Pr1.

Here, for example, it is assumed that the disc tilt angle θb is smaller than the disc tilt angle θa. As the disc tilt angle is larger, the decrease rate of the peak intensity of the focused light spot becomes larger. Therefore, the reproduction power Pr1b at which the reproduction performance becomes a bottom value (the minimum value, i.e., the best value) when the disc tilt angle θb (<θa) is given is less than the reproduction power Pr1a at which the reproduction performance becomes the bottom value when the disc tilt angle θa is given. In addition, a difference in the optical property of the material of the super-resolution layer is also a factor of the difference between the reproduction powers Pr1a and Pr1b at which the reproduction performance becomes the bottom value.

Next, description will be made of a setting method of the reproduction power Pr_R performed when the optical disc device of this embodiment reproduces the optical disc having the reproduction performance property A shown in FIG. 18.

First, the predetermined value e0 of the first reproduction performance and the predetermined value e1 of the second reproduction performance are provided. It is assumed that the predetermined value e0 of the first reproduction performance and the predetermined value e1 of the second reproduction performance satisfy a relationship e0<e1. In other words, it is assumed that the predetermined value e0 of the first reproduction performance indicates a better reproduction performance than the predetermined value e1 of the second reproduction performance.

The predetermined value e0 of the first reproduction performance is an upper limit of the reproduction performance which is set when no disc tilt occurs. This is a value of the reproduction performance (bER) which is needed when no disc tilt occurs, i.e., under the best optical condition where no comatic aberration due to the disc tilt occurs and factors deteriorating the reproduction performance are eliminated.

As shown in FIG. 18, the reproduction performance is less than or equal to e0 when the reproduction power is greater than or equal to Pr_L0 and less than or equal to Pr_H0. Further, the bottom value of the reproduction performance is e0_btm, and the reproduction power corresponding thereto is Pr0.

In other words, at least when no disc tilt occurs, the reproduction performance (less than or equal to e0) required under the best optical condition where no comatic aberration occurs can be obtained by setting the reproduction power Pr_R to at least any value which is greater than or equal to Pr_L0 and less than or equal to Pr_H0.

In contrast, when the maximum value θa of the disc tilt is given to the optical disc having the reproduction performance property A shown in FIG. 18, the bottom value of the reproduction performance is e1a_btm, and the reproduction power corresponding thereto is Pr1a which is greater than the above described reproduction power Pr0.

This is because it is necessary to increase the reproduction power since the peak intensity of the focused light spot decreases due to the effect of the comatic aberration resulting from the disc tilt as described above. This is a feature that conventional BD and DVD standard optical discs do not have. When the decrease in the peak intensity of the focused light spot due to the above described factors is expressed by D, the reproduction power Pr1a corresponds to approximately $(1+D) \times Pr0$.

e1 shown in FIG. 18 is a predetermined value of the bER defining the allowable limit of the reproduction performance. In order to obtain excellent reproduction performance (within the allowable range), it is necessary to limit the reproduction performance (the bER) to be less than or equal to e1. Further, the reproduction powers Pr_H1a and Pr_L1a are respectively upper and lower limits of the reproduction power satisfying that the reproduction performance is less than or equal to the allowable limit e1 when the maximum disc tilt θa is given.

Therefore, in a state where the maximum disc tilt θa is given, the reproduction performance (i.e., less than or equal to e1) needed when the maximum disc tilt θa is given can be obtained by setting the reproduction power Pr_R to at least any value which is greater than or equal to Pr_L1a and less than or equal to Pr_H1a.

From the above, when reproducing the super-resolution optical disc having the reproduction performance property A, the reproduction power Pr_R is set to any value which is greater than or equal to the lower limit Pr_L1a of the reproduction power at which the reproduction performance becomes less than or equal to e1 when the disc tilt θa is given, and which is less than or equal to Pr_H1a at which the reproduction performance becomes less than or equal to e0 when no disc tilt occurs.

Here, the super-resolution optical disc having the reproduction performance property A is so configured that the reproduction power Pr_H0 on the high-power side at which the reproduction performance becomes the predetermined value e0 when no disc tilt occurs is greater than the lower limit Pr_L1a of the reproduction power at which the reproduction performance becomes less than or equal to the predetermined value e1 when the disc tilt angle θa is given. That is, if it is defined that ΔPr_R=Pr_H0−Pr_L1a, ΔPr_R is positive. Therefore, the reproduction performance can be ensured.

With the above described setting method of the reproduction power Pr_R, an excellent reproduction performance (i.e., within the allowable range) can be obtained in the optical disc device where the disc tilt angle θa is defined as being the maximum.

Further, as shown in FIG. 18, in the case of the super-resolution optical disc having the property in which the reproduction power Pr_H0 is less than the reproduction power Pr1a at which the reproduction performance becomes the bottom value when the disc tilt angle θa is given, it is preferred to set the reproduction power Pr_R to Pr_H0. With such a setting, it becomes possible to minimize the reproduction performance when the maximum disc tilt angle θa is given, while limiting the reproduction performance to be less than or equal to the predetermined value e0 when no disc tilt occurs. Therefore, the reproduction performance of the overall system can be optimized.

Next, description will be made of the setting method of the reproduction power Pr_R performed when the optical disc device of this embodiment reproduces the optical disc having the reproduction performance property B shown in FIG. 19.

As shown in FIG. 19, in the reproduction performance B, the reproduction power Pr_H0 on the high-power side at which the reproduction performance becomes the predetermined value e0 when no disc tilt occurs is greater than the reproduction power Pr1b at which the reproduction performance becomes the bottom value when the disc tilt angle θb is given. The reproduction power Pr_H0 is greater than the reproduction power Pr_L1b, which is similar to the reproduction performance property shown in FIG. 18 (the reproduction power Pr_H0 is larger than the reproduction power Pr_L1a).

Therefore, in this embodiment, the reproduction power Pr_R is set to any value which is greater than or equal to the lower limit Pr_L1b of the reproduction power at which the reproduction performance becomes less than or equal to e1 when the disc tilt θb is given, and which is less than or equal to Pr_H0 at which the reproduction performance becomes less than or equal to e0 when no disc tilt occurs.

With the above described setting method of the reproduction power Pr_R, an excellent reproduction performance (i.e., within the allowable range) can be obtained in the optical disc device where the disc tilt angle θb is defined as being the maximum.

In this super-resolution optical disc, the reproduction power Pr_H0 is greater than the reproduction power Pr1b at which the reproduction performance becomes the bottom value e1b_btm when the disc tilt angle θb is given. Therefore, it is preferred to set the reproduction power Pr_R to Pr1b. With such a setting, it becomes possible to minimize the reproduction performance to the bottom value when the maximum disc tilt angle θb is given, while limiting the reproduction performance to be less than the predetermined value e0 when no disc tilt occurs. Therefore, the reproduction performance of the overall system can be optimized.

As was described above, the optical disc 6 includes the data area 61, the buffer area 62, and the information management area 63 in this order from an outer circumference. The information on the reproduction power Pr is stored in the information management area 63. The information on the reproduction power Pr includes information on the upper and lower limits of the reproduction power Pr, or information of desirable reproducing power. In the case of the optical disc having the reproduction performance property A shown in FIG. 18, the upper limit of the reproduction power Pr serving as the allowable limit of the reproduction performance of the optical disc is Pr_H0, and the lower limit is Pr_L1a. Further, the desirable reproduction power is Pr_H0. In contrast, in the case of the optical disc having the reproduction performance property B shown in FIG. 19, the upper limit of the reproduction power Pr serving as the allowable limit of the reproduction performance of the optical disc is Pr_H0, and the lower limit is Pr_L1b. Further, the desirable reproduction power is Pr1b.

Next, description will be made of a testing method for determining a performance of the super-resolution optical disc having the reproduction performance property A and the super-resolution optical disc having the reproduction performance property B according to this embodiment.

As shown in FIG. 20, in the testing method of the super-resolution optical disc having the reproduction performance property A, the reproduction performance is measured in a state where no disc tilt occurs, while setting a testing reproduction power value Pr_M to a value which is greater than or equal to Pr_L1a and less than or equal to Pr_H0 (step 1). Further, it is decided whether the reproduction performance (for example, the bER) is less than or equal to the predetermined value e0 (step 2). Then, the reproduction performance is measured in a state where the maximum disc tilt θa is given (step 3), while setting the testing reproduction power value Pr_M to a value which is greater than or equal to Pr_L1a and less than or equal to Pr_H0. Further, it is decided whether the reproduction performance is less than or equal to the predetermined value e1 (step 4). If the reproduction performance is less than or equal to the predetermined values e0 and e1 in the above described steps 2 and 4, it is decided that the optical disc being tested satisfies a quality capable of super-resolution reproduction (step 5). Otherwise, it is decided that the optical disc being tested does not satisfy the quality capable of super-resolution reproduction (step 6).

A testing method of the super-resolution optical disc having the reproduction performance property B is similar to the testing method of the super-resolution optical disc having the reproduction performance property A except that the reproduction performance property is measured while giving the maximum tilt angle θb in step 3 of FIG. 20. A determination method is as described above.

In this regard, a case where the reproduction performance is less than the predetermined values e0 and e1 in steps 2 and 4 of FIG. 20 (i.e. answers are YES in both steps) corresponds to a case where the upper limit Pr_H0 of the reproduction power at which the reproduction performance becomes less than or equal to the predetermined value e0 when no disc tilt occurs is greater than or equal to the lower limit Pr_L1 (Pr_L1a, Pr_L1b) of the reproduction power at which the reproduction performance becomes less than or equal to the predetermined value e1 when the maximum disc tilt angle θa (θb) is given.

Further, as the testing method of the super-resolution optical disc having the reproduction performance property B (FIG. 19), there is another method. That is, the reproduction performance is measured in a state where no disc tilt occurs, while setting the testing reproduction power value Pr_M to the reproduction power Pr1b at which the reproduction performance becomes the bottom value e1b_btm when the maximum disc tilt angle θb is given. Further, it is decided whether the reproduction performance (for example, the bER) is less than or equal to the predetermined value e0. If the reproduction performance is less than or equal to the predetermined value e0, it is decided that the optical disc being tested satisfies the quality capable of super-resolution reproduction. Otherwise, it is decided that the optical disc being tested does not satisfy the quality capable of super-resolution reproduction.

Further, in each of the super-resolution optical discs having the reproduction performance properties A and B, it is preferred that ΔPr_R is greater than an amount of fluctuation of the reproduction power caused by a variability in control of the light emission amount of the semiconductor laser 1 via the laser driving circuit 41. Since, the reproduction power is controlled within a fluctuation range of ±0.1 mW with respect to a setting value in a general laser driving circuit, it is preferred that ΔPr_R is greater than the fluctuation range (i.e., 0.2 mW or more). Therefore, it is preferred that a difference between Pr_L0 and Pr_H0 is greater than or equal to 0.2 mW.

Here, description has been made of the case where the quality of the optical disc is tested based on the information on upper and lower limits of the reproduction power Pr serving as the allowable limits of the reproduction performance of the optical disc or the information on the desirable reproduction power stored in the optical disc. However, it is also possible to use, for example, a value based on specifications of an allowable performance (i.e., information on upper and lower limits of the reproduction power Pr and information on the desirable reproduction power) defined by a standard or the like to test whether the optical disc being tested satisfies the allowable performance defined by the standard or the like.

As described above, according to the optical disc device and the super-resolution optical disc according to Embodiment 5 of the present invention, the reproduction performance can be ensured to the maximum disc tilt, and therefore a high-density optical disc reproduction system capable of excellent reproduction can be achieved.

Further, according to the testing method of the optical disc according to Embodiment 5 of the present invention, it becomes possible to decide whether the optical disc being tested satisfies the quality such that the optical disc can be excellently reproduced by the optical disc device.

It is also possible to apply Embodiment 5 to either of the above described Embodiments 2 and 3. That is, the optical disc may have a single information recording layer, or a plurality of information recording layers. Further, the collimator lens driving device 30 may be provided or not.

In this regard, the optical disc devices in Embodiments 1 through 5 are not limited to the optical disc devices shown in FIGS. 1, 8, 10, 15 and 17. Other components can be added to the components shown in these figures. Further, the components shown in these figures can be replaced with other components having the same functions.

Further, in the respective Embodiments, the laser driving circuit controls the driving current Iop of the semiconductor laser 1 based on the detected current (i.e., the monitor current) Im from the back-monitor light receiving element of the semiconductor laser 1. However, the present invention is not limited to such a configuration. For example, it is possible to control the driving current Iop of the semiconductor laser 1 based on a detected current Im from the front-monitor light receiving element which is disposed so as to detect a part of the light beam 2 emitted by the semiconductor laser 1.

REFERENCE CHARACTERS

1: semiconductor laser, 2: light beam, 3: prism, 4: collimator lens, 5: objective lens, 6: optical disc, 61: data area, 63: information management area, 7: optical element, 8: light-receiving element, 9: modulation amplitude detection circuit, 10: inverter circuit, 11, 21, 31, 41, 51: laser driver circuit, 30: collimator lens driving device, 22, 32, 42, 52: light emission amount setting portion, 43, 53: reading portion.

The invention claimed is:
1. An optical disc device that reproduces a super-resolution optical disc using an objective lens,
   wherein a value Pr1 represents a reproduction power corresponding to a best value of an index indicating a reproduction performance when the optical disc is applied with a maximum disc tilt angle of an allowable range for the optical disc;
   wherein a value Pr_H0 represents a reproduction power corresponding to a limit value of an index indicating a reproduction performance when the optical disc is applied with no disc tilt, the limit value being on a higher reproduction power side with respect to a best value of the index;
   wherein when the value Pr1 is greater than or equal to the value Pr_H0 based on a property of the optical disc, the optical disc device sets a reproduction power for reproducing information from the optical disc to the value Pr_H0; and wherein when the value Pr1 is smaller than the value PrH0 based on the property of the optical disc, the optical disc device sets the reproduction power for reproducing information from the optical disc to the value Pr1.

2. The optical disc device according to claim 1, wherein the optical disc device reads out the value Pr_H0 or the value Pr1 from an information management area of the super-resolution optical disc.

3. A method of determining a reproduction power for reproducing information from a super-resolution optical disc using an objective lens, wherein a value Pr1 represents a reproduction power corresponding to a best value of an index indicating a reproduction performance when the optical disc is applied with a maximum disc tilt angle of an allowable range for the optical disc; and wherein a value Pr_H0 represents a reproduction power corresponding to a limit value of an index indicating a reproduction performance when the optical disc is applied with no disc tilt, the limit value being on a higher reproduction power side with respect to a best value of the index;

the method comprising:

setting a reproduction power for reproducing the optical disc to the value $Pr_{13}$ H0, when the value Pr1 is greater than or equal to the value Pr_H0 based on a property of the optical disc; and setting the reproduction power for reproducing the optical disc to the value Pr1, when the value Pr1 is smaller than the value Pr_H0 based on the property of the optical disc.

4. The method according to claim 3, wherein the value Pr_H0 or the value Pr1 is read out from an information management area of the super-resolution optical disc.

5. A method for testing whether an optical disc is capable of super-resolution reproduction using an objective lens, comprising:

a first step of measuring an index indicating a reproduction performance when the optical disc is applied with no disc tilt;

a second step of determining an upper limit Pr_H0 of a reproduction power with which the index measured by the first step is less than or equal to a first predetermined value;

a third step of measuring an index indicating a reproduction performance when the optical disc is applied with a maximum disc tilt angle of an allowable range for the optical disc;

a fourth step of determining a lower limit Pr_L1 of a reproduction power with which the index obtained by the third step is less than or equal to a second predetermined value; and a fifth step of determining that the optical disc is capable of super-resolution reproduction, when the upper limit PrH0 obtained by the second step is greater than or equal to the lower limit Pr_L1 obtained by the fourth step.

6. A method for testing whether an optical disc is capable of super-resolution reproduction using an objective lens, comprising:

a first step of measuring an index indicating a reproduction performance when the optical disc is applied with no disc tilt;

a second step of determining a lower limit Pr_L0 and an upper limit Pr_H0 of a reproduction power when the index measured by the first step is less than or equal to a first predetermined value;

a third step of measuring an index indicating a reproduction performance when the optical disc is applied with a maximum disc tilt angle of an allowable range for the optical disc;

a fourth step of determining a value Pr1 corresponding to a best value of the index obtained by the third step; and a fifth step of determining that the optical disc is capable of super-resolution reproduction, when the value Pr1 obtained by the fourth step is greater than or equal to the lower limit Pr_L0 obtained by the second step and is less than or equal to the upper limit Pr_H0 obtained by the second step.

* * * * *